(12) United States Patent
Ohzawa

(10) Patent No.: US 6,201,647 B1
(45) Date of Patent: Mar. 13, 2001

(54) IMAGE DISPLAY APPARATUS

(75) Inventor: Soh Ohzawa, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/342,484

(22) Filed: Jun. 29, 1999

(30) Foreign Application Priority Data

Jul. 6, 1998 (JP) .................................. 10-190456
Jul. 6, 1998 (JP) .................................. 10-190458

(51) Int. Cl.$^7$ .......................... G02B 27/14; G02B 25/00; G02B 3/00
(52) U.S. Cl. .......................... 359/631; 359/630; 359/643; 359/649
(58) Field of Search ..................... 359/618, 630, 359/631, 632, 634, 643, 649

(56) References Cited

U.S. PATENT DOCUMENTS

| 5,663,833 | 9/1997 | Nanba et al. | 359/631 |
| 5,710,668 | * 1/1998 | Gohman et al. | 359/634 |
| 5,726,807 | * 3/1998 | Nakaoka et al. | 359/631 |
| 5,926,321 | * 7/1999 | Shikama | 359/644 |
| 6,008,947 | * 12/1999 | Togino | 359/630 |

FOREIGN PATENT DOCUMENTS

| 405323229 | * 12/1993 | (JP) | G02B/27/02 |
| 7-218860 | 8/1995 | (JP) . | |
| 7-234376 | 9/1995 | (JP) . | |
| 8-292371 | 11/1996 | (JP) . | |
| 9-083908 | 3/1997 | (JP) . | |
| 10-075407 | 3/1998 | (JP) . | |

* cited by examiner

Primary Examiner—Georgia Epps
Assistant Examiner—Saeed Seyrafi
(74) Attorney, Agent, or Firm—Sidley & Austin

(57) ABSTRACT

An image display apparatus has a display unit and an eyepiece optical system. The display unit displays a two-dimensional image. The eyepiece optical system projects the two-dimensional image into an observer's pupil to enable the observer to view an enlarged virtual image of the two-dimensional image. The optical axis of the eyepiece optical system is decentered from the visual axis of the observer's pupil.

20 Claims, 24 Drawing Sheets

IMAGE DISPLAY APPARATUS

This application is based on applications Nos. H10-190456 and H10-190458 filed in Japan, the contents of which are hereby incorporated by reference.

BACKGROUND OF THE INVENTION

1. Field of the Invention

The present invention relates to an image display apparatus, and particularly, to an image display apparatus such as an HMD (head mounted display) for projecting a two-dimensional image displayed on a liquid crystal display into an observer's pupil through an eyepiece optical system to enable the observer to view an enlarged virtual image of the two-dimensional image.

2. Description of the Prior Art

Conventionally, various types of image display apparatuses have been proposed that project a two-dimensional image displayed on a display unit through an eyepiece optical system to display an enlarged virtual image of the original image. For example, image display apparatuses are known that employ a transmission-type liquid crystal display or a transmission-type screen as a display unit.

In an image display apparatus of the type that employs a transmission-type liquid crystal display, it is so difficult to achieve satisfactorily high density in the transmission-type liquid crystal that it is impossible to achieve a satisfactorily wide angle of view and satisfactorily high-resolution image display. Moreover, an image display apparatus of this type requires a space for accommodating an illumination optical system for illuminating the liquid crystal, and thus it is difficult to make it satisfactorily compact. In contrast, in an image display apparatus of the type that employs a transmission-type screen, it is possible to project a high-resolution image onto the transmission-type screen and thus achieve a satisfactorily wide angle of view and satisfactorily high-resolution image display. However, this image display apparatus, requiring a light source, a projecting optical system, a transmission-type screen, and an eyepiece optical system to be arranged therein, tends to have an unduly long total length, and thus it is even more difficult to make it compact.

SUMMARY OF THE INVENTION

An object of the present invention is to provide a compact image display apparatus.

To achieve the above object, according to one aspect of the present invention, an image display apparatus is provided with a display unit and an eyepiece optical system. The display unit displays a two-dimensional image. The eyepiece optical system projects the two-dimensional image into an observer's pupil to enable the observer to view an enlarged virtual image of the two-dimensional image. In this image display apparatus, the optical axis of the eyepiece optical system is decentered from the visual axis of the observer's pupil.

According to another aspect of the present invention, an image display apparatus is provided with a display unit and an eyepiece optical system. The display unit displays a two-dimensional image. The eyepiece optical system projects the two-dimensional image into an observer's pupil to enable the observer to view an enlarged virtual image of the two-dimensional image. In this image display apparatus, the display unit is composed of a reflection-type screen or a reflection-type two-dimensional display device, and the eyepiece optical system has at least one reflecting surface and has an optical axis decentered from the visual axis of the observer's pupil.

In the present specification, the term "an observer's pupil" means the virtual pupil arranged in order to design an optical system and corresponds to the exit pupil of the eyepiece optical system, and the visual axis of the observer's pupil is fixed in a predetermined direction.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
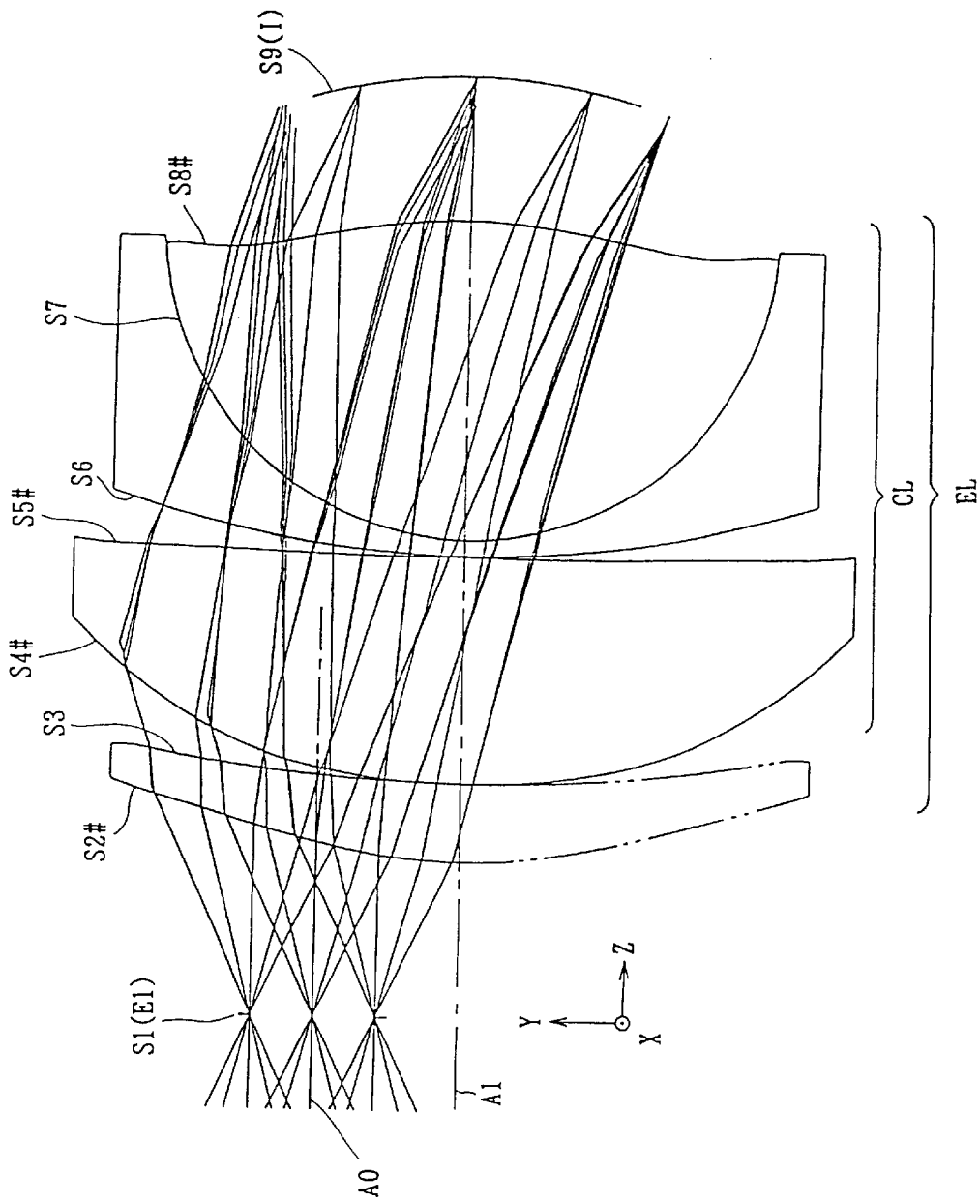
FIG. 1 is an optical arrangement diagram illustrating the eyepiece optical system, together with the optical path therethrough, employed in a first embodiment (Example 1) of the present invention.

Hereinafter, image display apparatuses embodying the present invention will be described with reference to the accompanying drawings. Note that, in the drawings, X, Y, and Z indicate directions perpendicular to one another, with the direction perpendicular to the pupil (E1 and E2) used as the Z direction. Note also that, in the following descriptions, components that play the same or corresponding roles in different embodiments will be identified with the same reference symbols and overlapping descriptions will be omitted.

Figure 2:
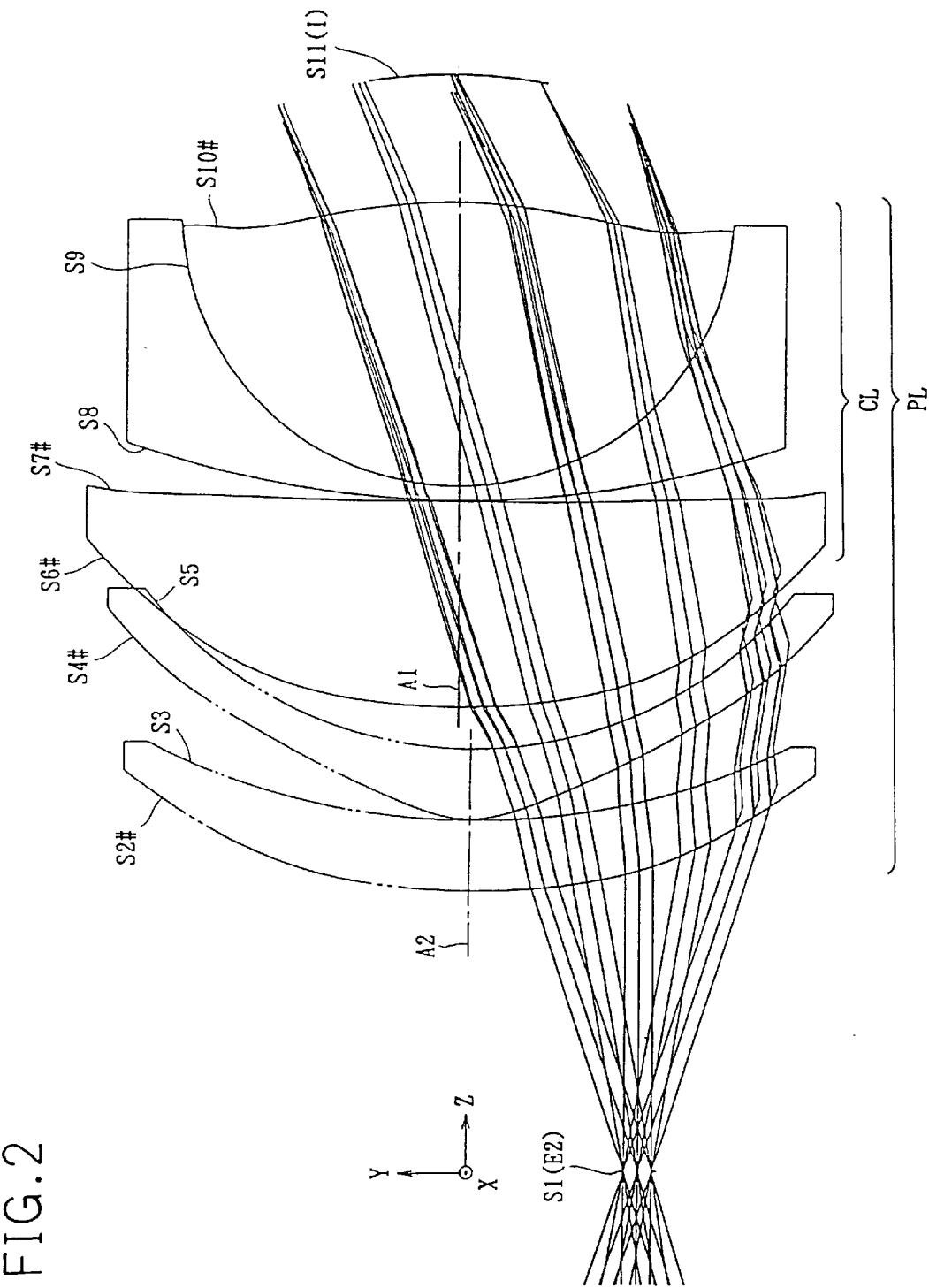
FIG. 2 is an optical arrangement diagram illustrating the projecting optical system, together with the optical path therethrough, employed in the first embodiment (Example 1)
Figure 3:
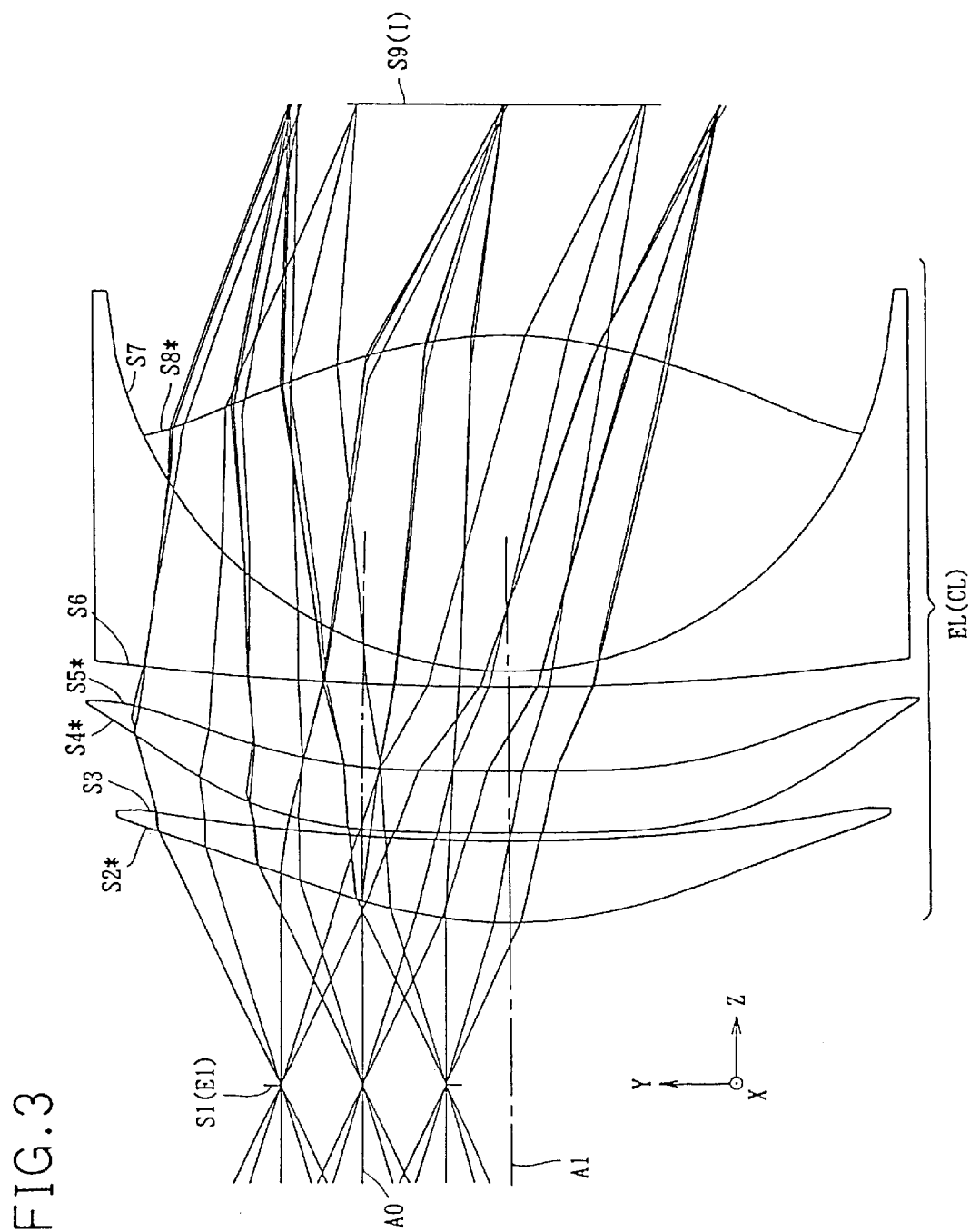
FIG. 3 is an optical arrangement diagram illustrating the eyepiece optical system, together with the optical path therethrough, employed in a second embodiment (Example 2) of the present invention.
Figure 4:
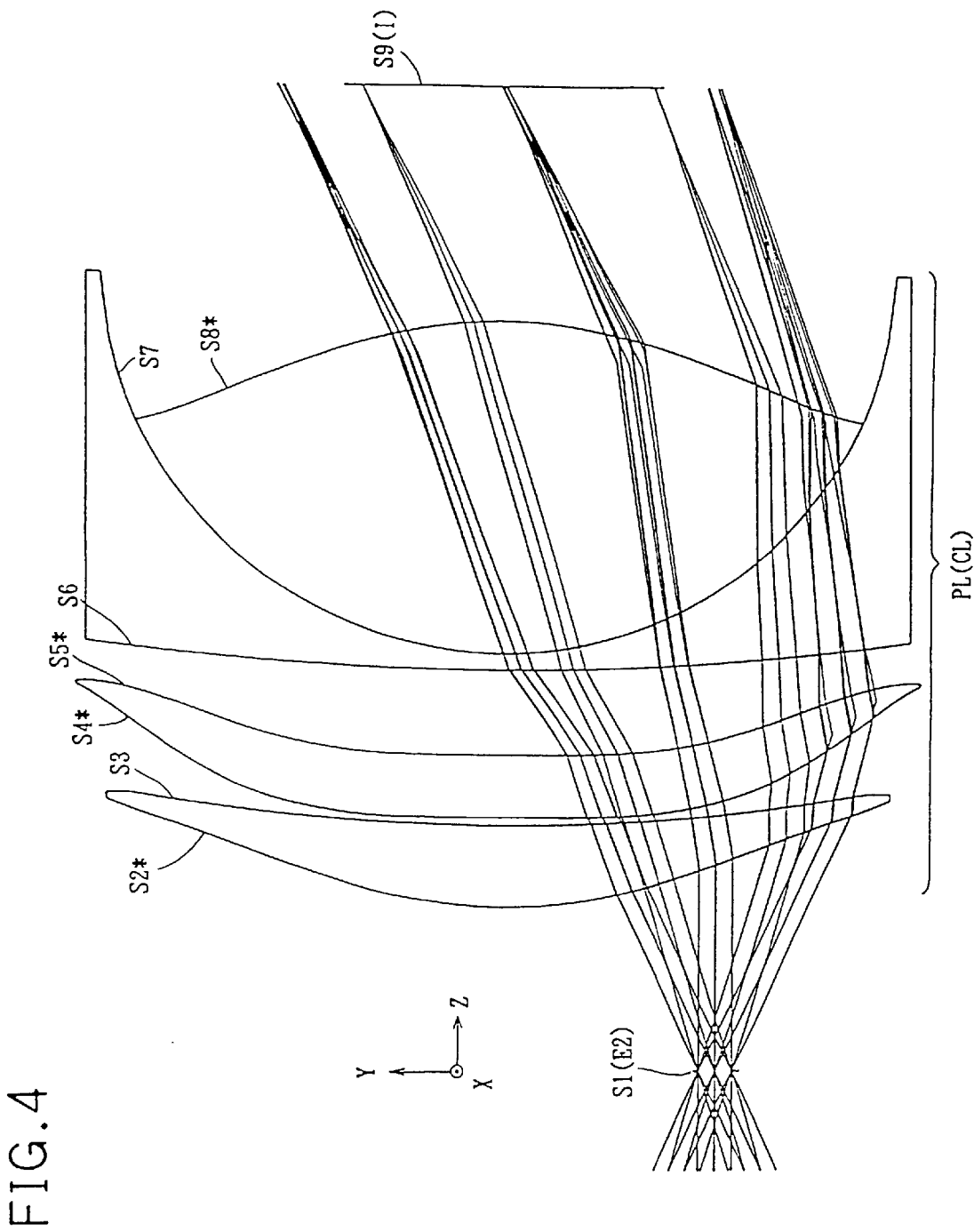
FIG. 4 is an optical arrangement diagram illustrating the projecting optical system, together with the optical path therethrough, employed in the second embodiment (Example 2)
Figure 5:
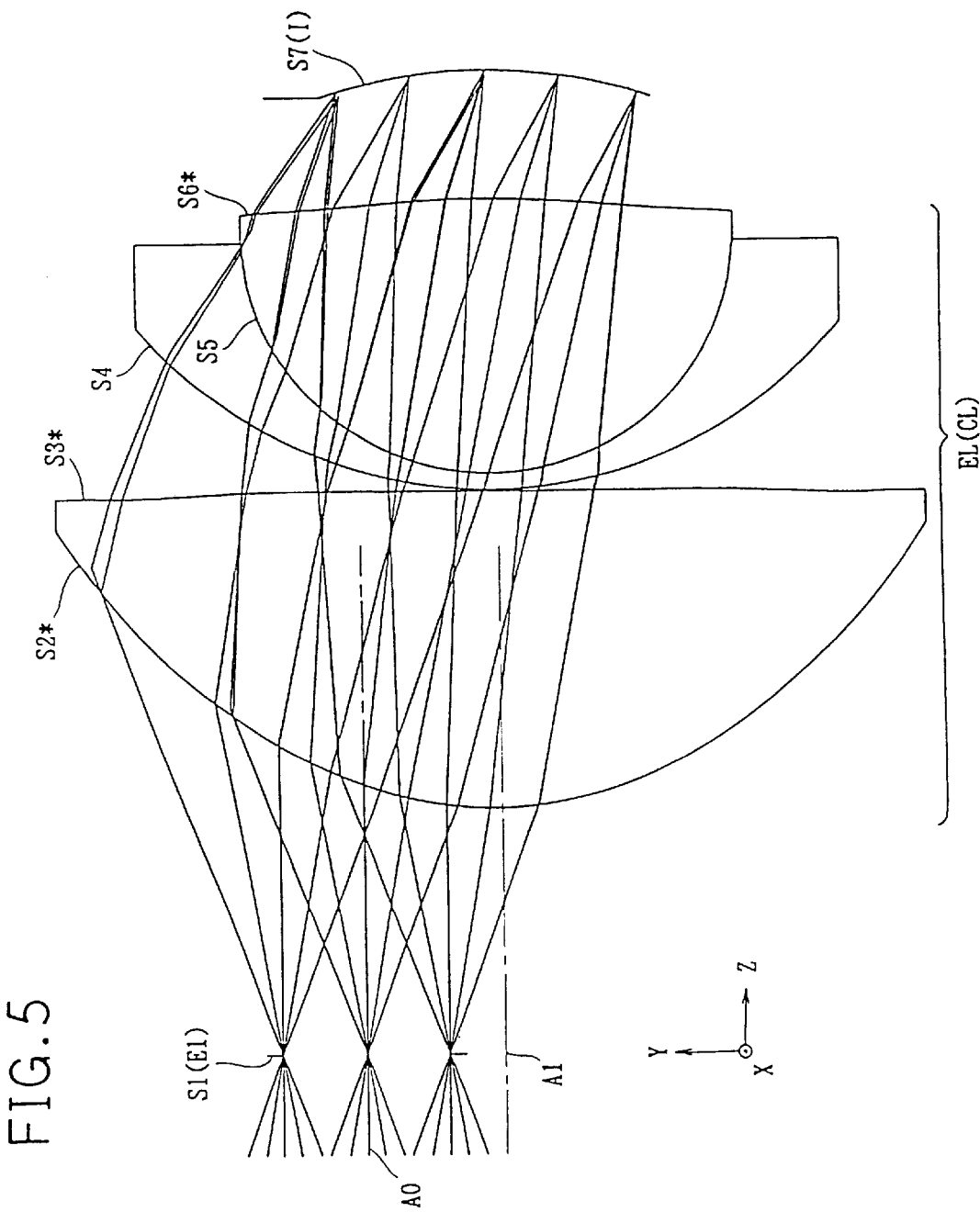
FIG. 5 is an optical arrangement diagram illustrating the eyepiece optical system, together with the optical path therethrough, employed in a third embodiment (Example 3) of the present invention.
Figure 6:
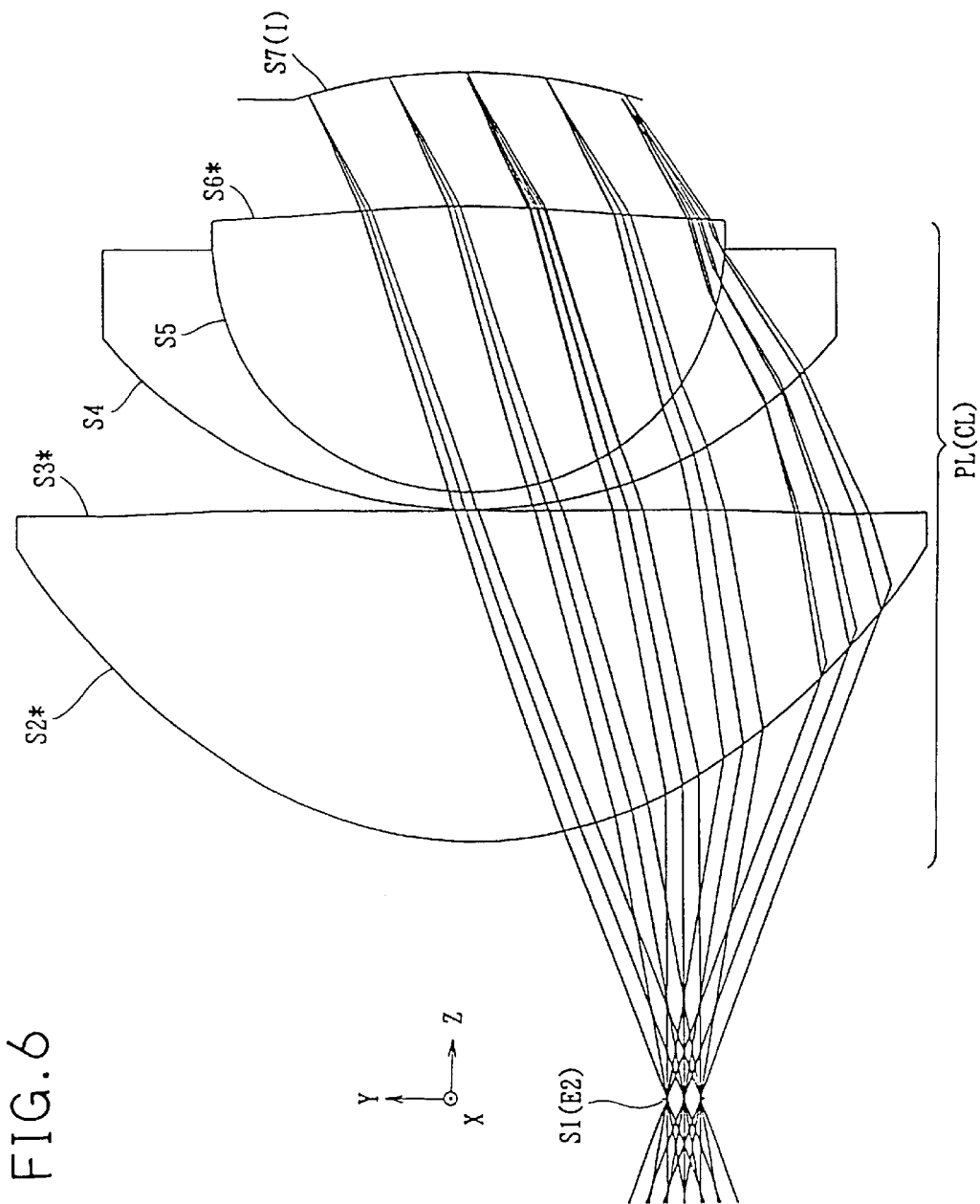
FIG. 6 is an optical arrangement diagram illustrating the projecting optical system, together with the optical path therethrough, employed in the third embodiment (Example 3)
Figure 13:
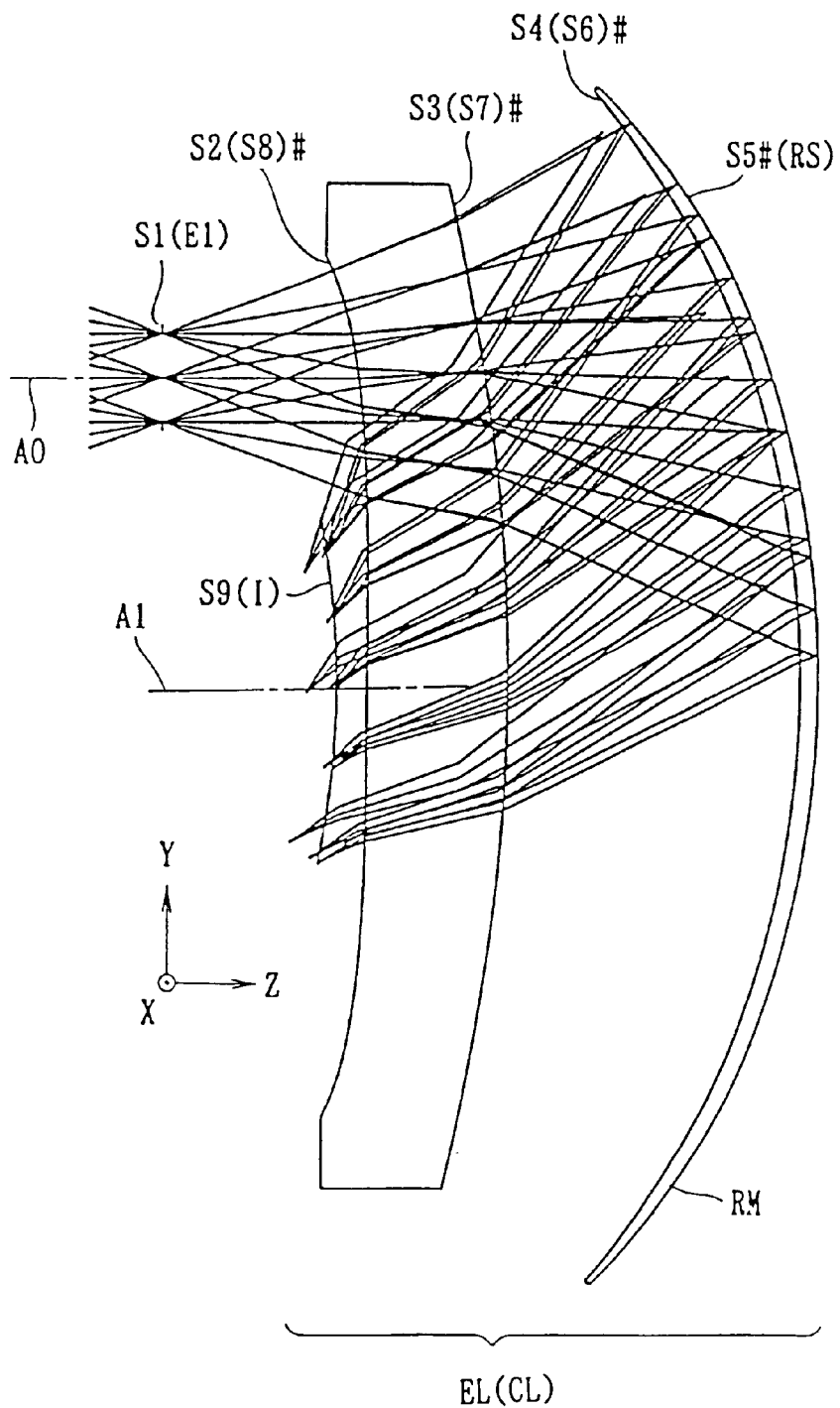
FIG. 13 is an optical arrangement diagram illustrating the eyepiece optical system, together with the optical path therethrough, employed in a fourth embodiment (Example 4) of the present invention.
Figure 14:
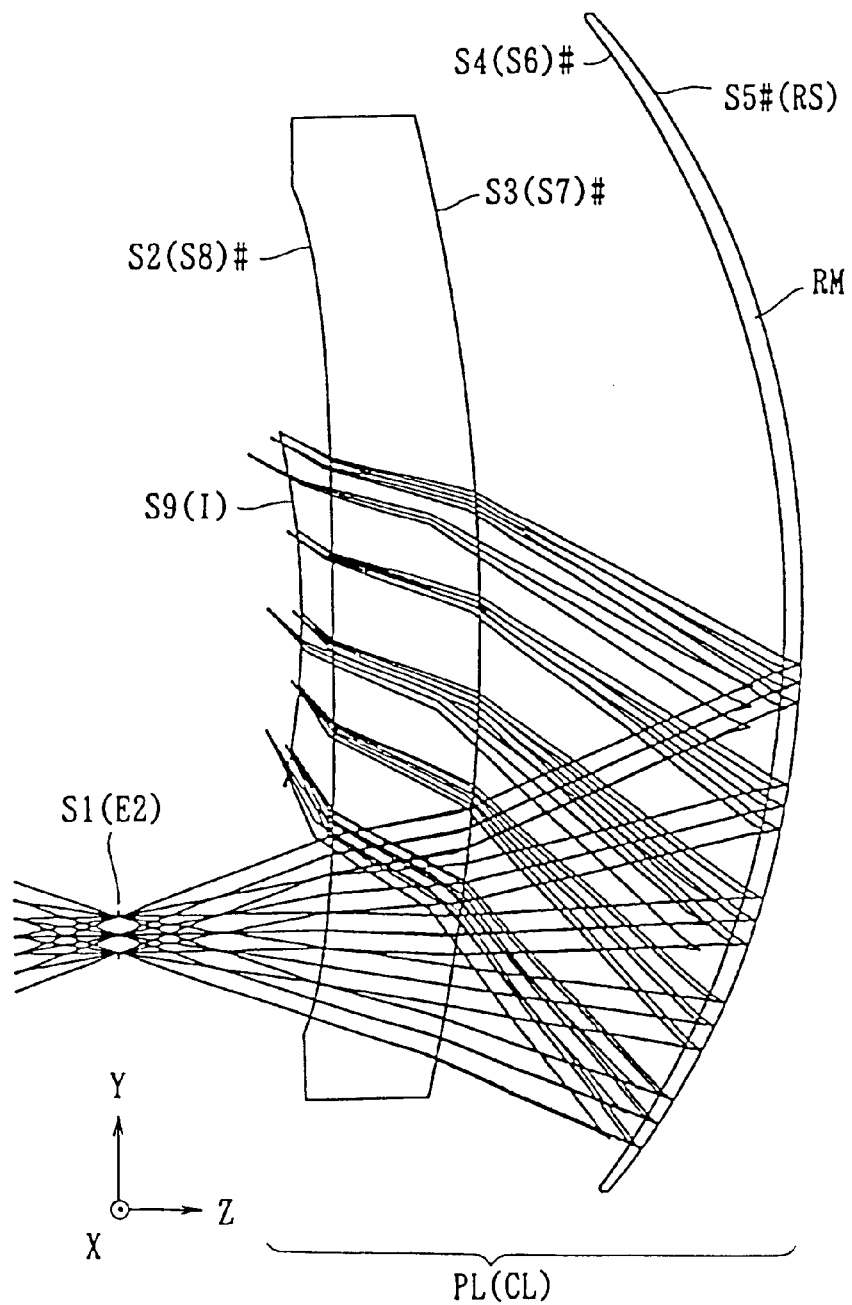
FIG. 14 is an optical arrangement diagram illustrating the projecting optical system, together with the optical path therethrough, employed in the fourth embodiment (Example 4)
Figure 15:
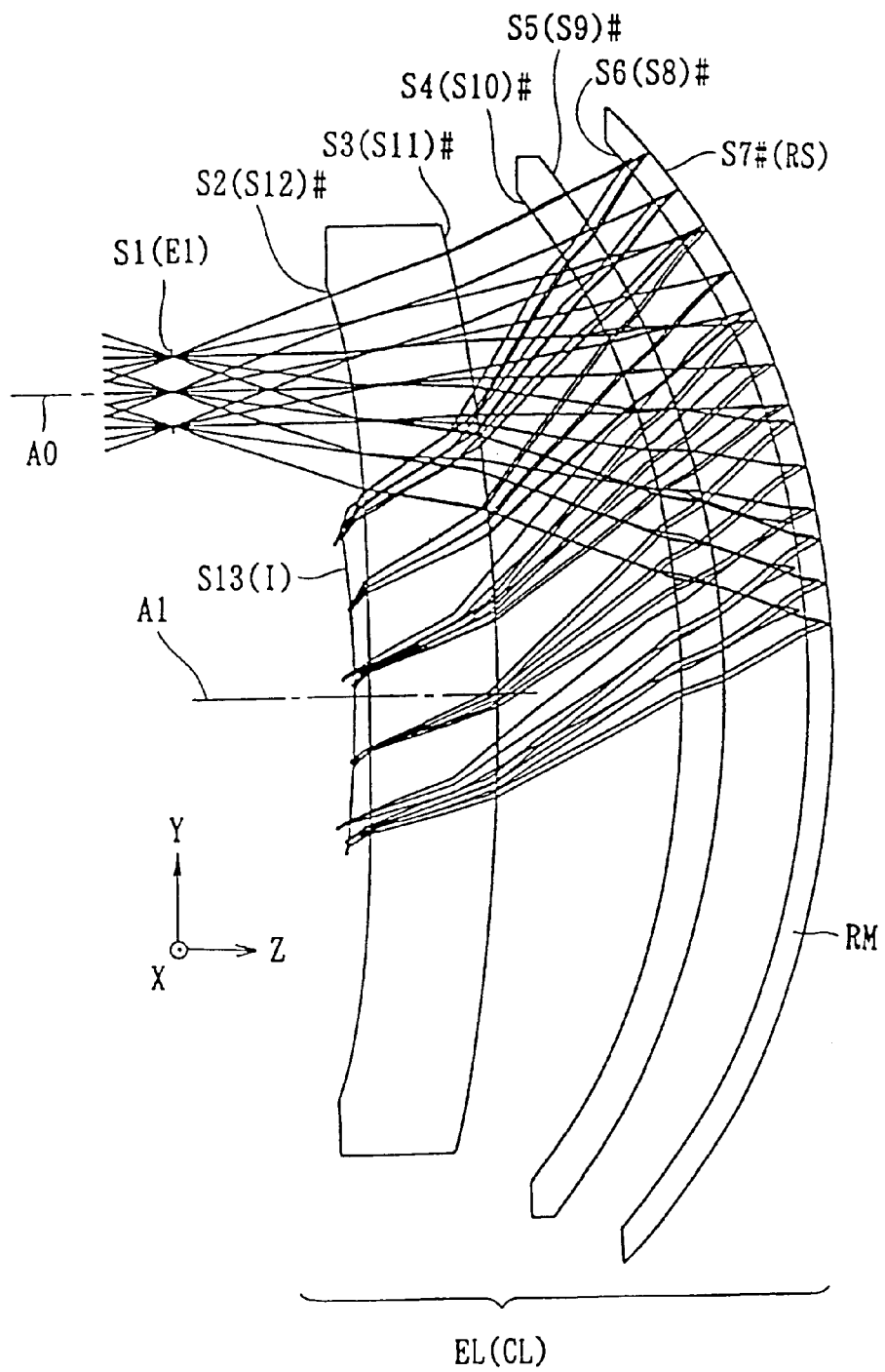
FIG. 15 is an optical arrangement diagram illustrating the eyepiece optical system, together with the optical path therethrough, employed in a fifth embodiment (Example 5) of the present invention.
Figure 16:
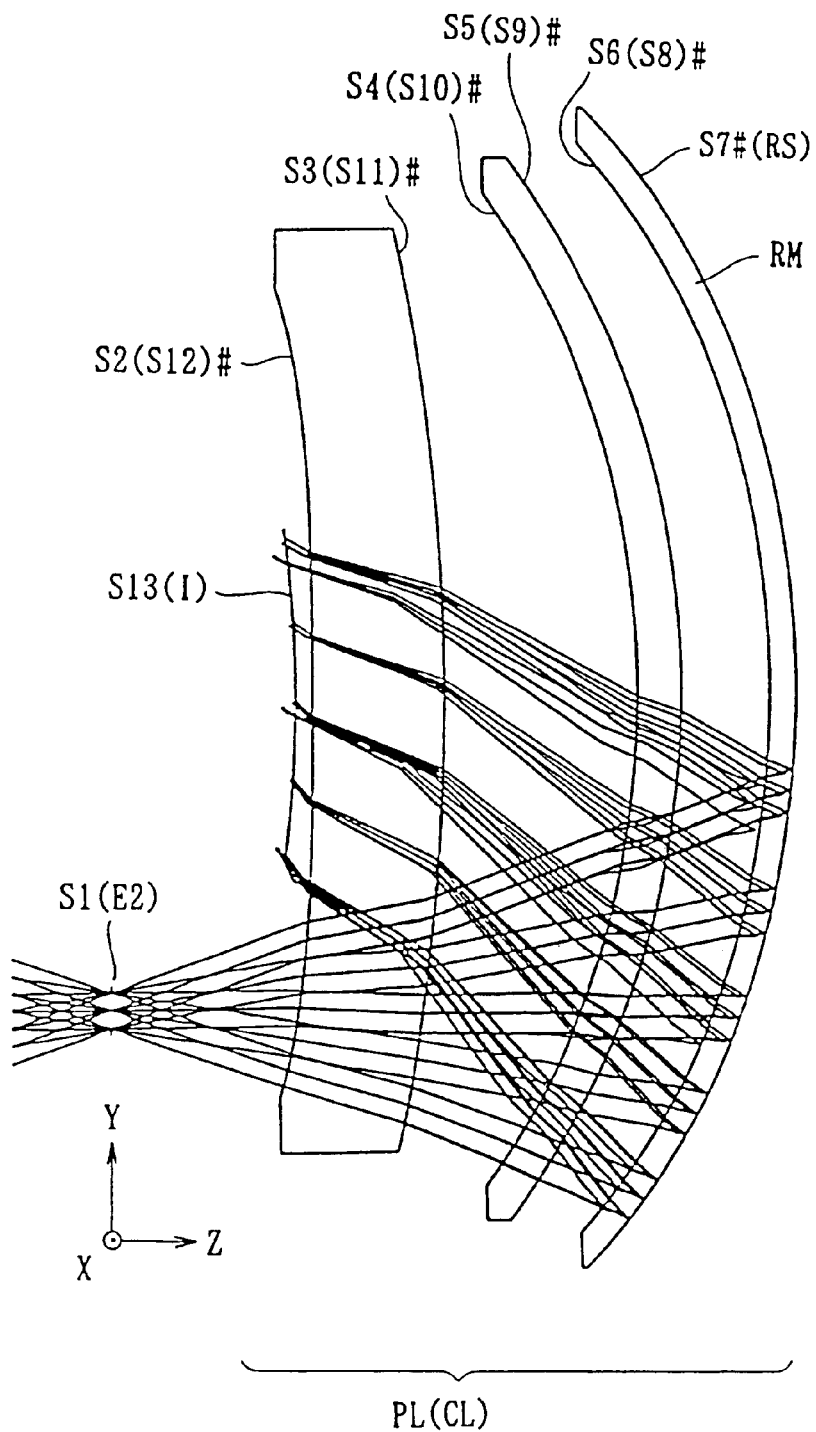
FIG. 16 is an optical arrangement diagram illustrating the projecting optical system, together with the optical path therethrough, employed in the fifth embodiment (Example 5)
Figure 17:
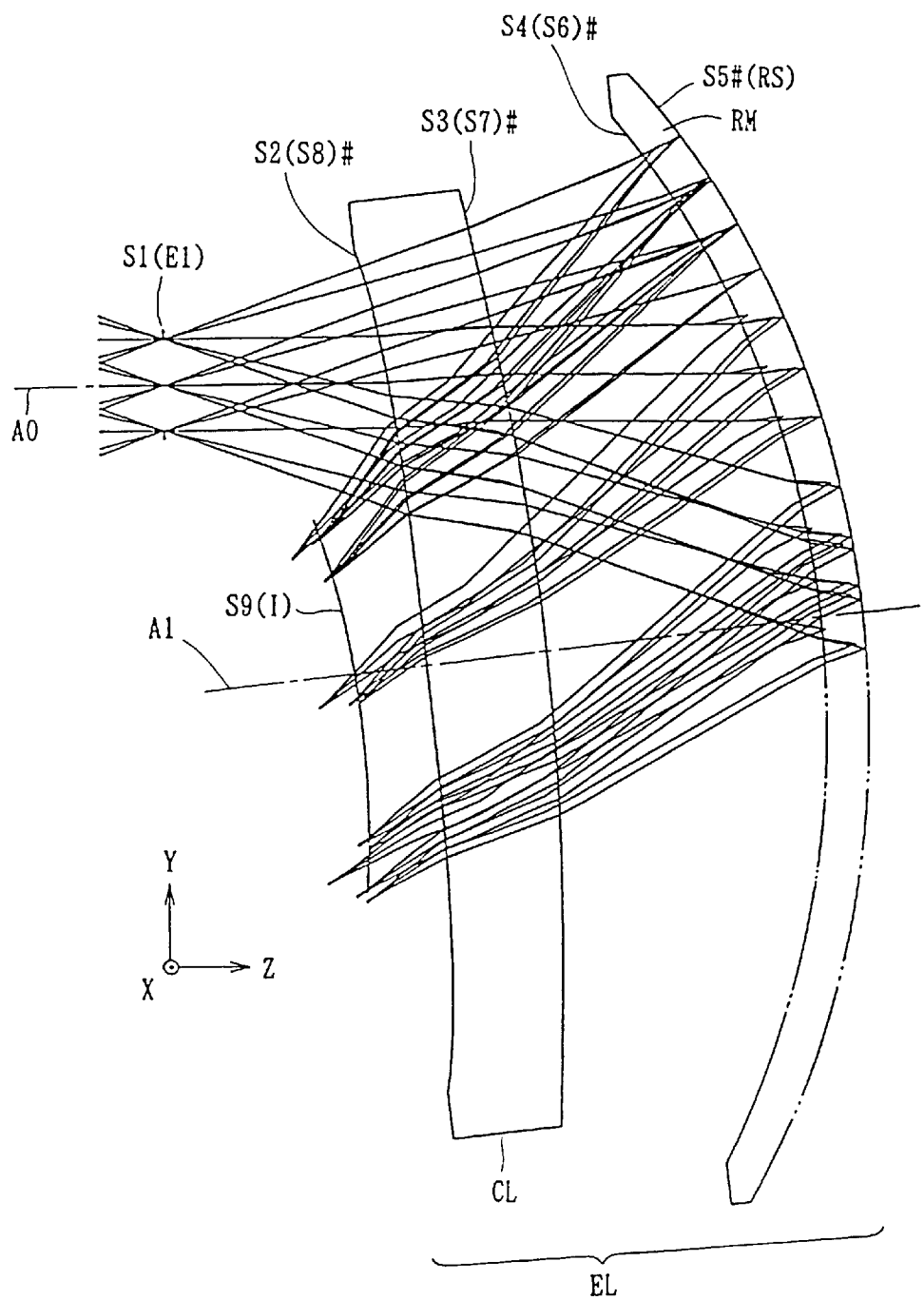
FIG. 17 is an optical arrangement diagram illustrating the eyepiece optical system, together with the optical path therethrough, employed in a sixth embodiment (Example 6) of the present invention.
Figure 18:
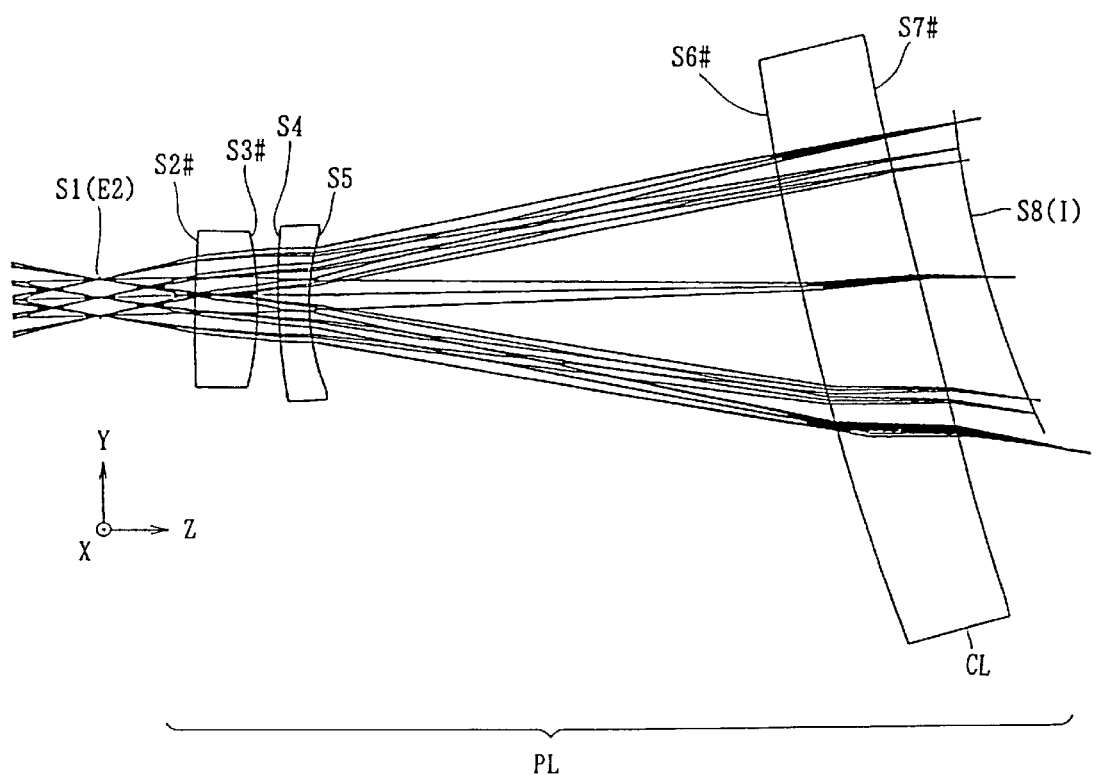
FIG. 18 is an optical arrangement diagram illustrating the projecting optical system, together with the optical path therethrough, employed in the sixth embodiment (Example 6)

FIGS. 1, 3, 5, 13, 15, and 17 are optical arrangement diagrams of the eyepiece optical system (EL) employed in a first to a sixth embodiment, respectively, of the present invention. In these diagrams, E1 represents an observer's pupil, which corresponds to the exit pupil of the eyepiece optical system (EL). FIGS. 2, 4, 6, 14, 16, and 18 are optical arrangement diagrams of the projecting optical system (PL) employed in the first to sixth embodiments, respectively. In these diagrams, E2 represents the pupil of the projecting optical system (PL) (i.e. the entrance pupil corresponding to the deflection plane for scanting). Moreover, in each optical arrangement diagram, I represents the image plane. The image plane (I) corresponds to the display surface of a display unit (for example, a reflection-type screen or a reflection-type two-dimensional display device) for displaying a two-dimensional image. Furthermore, a surface marked with Si (i=1, 2, 3, ... ) is the ith surface counted from the pupil (E1 or E2) side in the optical system including the pupil (E1 or E2) and the image plane (I), a surface Si marked with an asterisk (*) is an aspherical surface, and a surface Si marked with # is an anamorphic aspherical surface.

All of these embodiments are provided with a reflection-type screen, an eyepiece optical system (EL), and a projecting optical system (PL). The reflection-type screen serves as a display unit for displaying a two-dimensional image. The eyepiece optical system (EL) projects the two-dimensional image into an observer's pupil so as to enable the observer to view an enlarged virtual image of the two-dimensional image. The projecting optical system (PL) projects an image onto the reflection-type screen. Moreover, in each embodiment, at least part of the eyepiece optical system (EL) constitutes at least part of the projecting optical system (PL), this part serving as a shared optical system (CL). Specifically, in the first and sixth embodiments, part of the eyepiece optical system (EL) is shared as part of the projecting optical system (PL), this part being used as a shared optical system (CL). On the other hand, in the second to fifth embodiments, the whole of the eyepiece and projecting optical systems (EL and PL) are used as a shared optical system (CL). Note that, in the first embodiment, the optical elements constituting each of the optical systems (EL and PL) except those constituting the shared optical system (CL) constitute an arrangement composed of optical elements that are essential to form an optical path through this optical system (EL or PL). Note also that, in the sixth embodiment, the eyepiece optical system (EL) includes a reflection mirror (RM) that is composed solely of an optical element that is essential to form an optical path through this optical system (EL).

In the first, and third to sixth embodiments, the image plane (I) is curved, and therefore a reflection-type screen can be used suitably as a display unit. On the other hand, in a case where, as in the second embodiment, the image plane (I) is flat, a reflection-type two-dimensional display device can be used suitably as a display unit. In this way, it is preferable that a display unit for displaying a two-dimensional image be realized by the use of a reflection-type screen or a reflection-type two-dimensional display device. The use of a reflection-type display unit eliminates the need to arrange a light source and optical members behind the display unit. This makes it possible to reduce the total length of the entire image display apparatus and simultaneously achieve higher-resolution image display than can be achieved in an image display apparatus employing a transmission-type liquid crystal display.

Although, in all of these embodiments, it is possible to realize the display unit by the use of either a reflection-type screen or a reflection-type two-dimensional display device, in an image display apparatus that employs a reflection-type two-dimensional display device as its display unit, it is possible to use, as an illumination optical system for illuminating the reflection-type two-dimensional display device, a projecting optical system (PL). The pupil (E2) of the projecting optical system (PL) is the entrance pupil that corresponds to the deflection plane for scanning. In a case where the projecting optical system (PL) is used as an illumination optical system, the position of the pupil (E2) is used as the light source position.

In each embodiment, the optical axis (A1) of the eyepiece optical system (EL) is decentered from the visual axis (A0) of an observer's pupil. This arrangement facilitates securing a space in the image display apparatus for disposing a projecting or illumination) optical system (PL). This makes it possible to dispose a projecting (or illumination) optical system (PL) on the same side as the pupil (E1) and thereby make the image display apparatus compact.

In the fourth to sixth embodiments, the eyepiece optical system (EL) includes one reflecting surface (RS). By providing at least one reflecting surface (RS) in the eyepiece optical system (EL) in this way, it is possible to make the optical path turn and converge at the same time. Moreover, the decentering mentioned above helps prevent overlap of optical paths, which imposes various restrictions on optical arrangement. Thus, it is possible to make the entire optical systems compact. It is preferable to use a reflecting surface that, like the reflecting surface (RS), is based on back-surface reflection. This is because, by providing a reflecting surface (RS) that is based on back-surface reflection in the eyepiece optical system (EL), it is possible to control the reflection mirror (RM) separately in terms of its reflecting-surface shape and in terms of its refracting-surface shape, and thereby increase the flexibility in aberration correction. This makes it possible to correct aberrations properly with as few optical elements as possible and thereby further reduce the size of the entire optical systems.

In an image display apparatus that has, like that of each embodiment, a projecting optical system (PL) for projecting an image onto a reflection-type screen or an illumination optical system for illuminating a reflection-type two-dimensional display device, it is preferable that at least part of the eyepiece optical system (EL) constitute at least part of the projecting (or illumination) optical system (PL), this part serving as a shared optical system (CL). This arrangement conveniently allows the optical paths through the eyepiece and projecting (or illumination) optical systems (EL and PL) to overlap with each other, and thus makes it possible to secure a wide angle of view and to reduce the total length of the optical systems. Moreover, by using a shared optical system (CL) as at least part of the optical systems (EL and PL), it is possible to reduce costs accordingly.

It is preferable to design, as in the first, and third to sixth embodiments, the display unit to display a two-dimensional image on a curved surface. By designing the display unit in that way, it is possible to curve the image plane (I) in accordance with the curvature of field occurring in the eyepiece and projecting optical systems (EL and PL). This helps simplify the design of the optical systems and also achieve a wide angle of view. Moreover, in a case where the eyepiece optical system (EL) is composed of a refractive lens element, it is preferable that, as in the first and third embodiments, the display unit be designed to display a two-dimensional image concave to the pupil (E1). By designing the display unit in that way, the curvature of field caused by a positively-powered refractive lens element can be corrected by the display unit. This makes it possible to simplify the design of the optical systems and achieve a wide angle of view.

It is preferable that, as in the fourth to sixth embodiments, the reflection mirror (RM) have a reflecting surface (RS) concave to the pupil (E1). By designing the reflection mirror (RM) in that way, it is possible to make the light beam traveling toward the pupil (E1) converge and thereby achieve a wide angle of view. Moreover, it is preferable that the reflection-type screen (or two-dimensional display device) have, as its display surface, a curved surface convex to the reflecting surface (RS). By designing the curved surface in that way, the curvature of field occurring in the reflecting surface (RS) concave to the pupil (E1) can be corrected by the reflection-type screen or reflection-type two-dimensional display device. This helps simplify the design of the eyepiece optical system (EL) and thereby make it compact and light-weight.

Moreover, in the first, and fourth to sixth embodiments, the shared optical system (CL) is provided with at least one optical surface formed as a rotationally-asymmetrical surface (i.e. an anamorphic aspherical surface). This surface exhibits symmetry with respect to the plane (the first plane of symmetry) including the optical axis (A1) of the shared optical system (CL) and the visual axis (A0) of the observer's pupil and also with respect to the plane (the second plane of symmetry) perpendicular to the first plane of symmetry along the optical axis (A1) of the shared optical system (CL). Note that, in each embodiment, the optical axis (A1) of the shared optical system (CL) coincides with the optical axis of the eyepiece optical system (EL). In the first embodiment, however, that part of the projecting optical system (PL) which is not included in the shared optical system (CL) is translationally decentered from the optical axis (A1) of the shared optical system (CL). Therefore, in FIG. 2, the optical axis of this decentered part is indicated as A2.

As described above, it is preferable that the shared optical system (CL) be provided with at least one optical surface formed as a rotationally-asymmetrical surface, and that the rotationally-asymmetrical surface exhibit symmetry with respect to the plane (the first plane of symmetry) including the optical axis (A1) of the shared optical system (CL) and the visual axis (A0) of the observer's pupil and also with respect to the plane (the second plane of symmetry) perpendicular to the first plane of symmetry along the optical axis (A1) of the shared optical system (CL). This makes it possible to obtain symmetrical aberration characteristics with respect to the first plane of symmetry, and thereby achieve natural variation in the imaging performance from the center of the observer's field of view toward both sides of the first plane of symmetry. Moreover, it is also possible to obtain symmetrical aberration characteristics with respect to the second plane of symmetry, i.e. between the observer's pupil (E1) side and the projecting optical system (PL)'s pupil (E2) side. This conveniently facilitates sharing part of these two optical systems (EL and PL), i.e. forming a shared optical system (CL). Moreover, the asymmetrical aberration caused by decentering the optical axis (A1) from the visual axis (A0) can be easily corrected by means of the rotationally-asymmetrical surface that exhibits the symmetry as described above.

It is preferable that, in the projecting optical system (PL), a two-dimensional image be projected by mirror scanning. This makes it possible to combine the projecting optical system (PL) with a parallel light source and a scanning mirror, and thus make the entire image display apparatus compact. Moreover, it is preferable that the length of the optical path from the scanning mirror to the reflection-type screen be made longer than that from the pupil (E2) to the reflection-type screen, and that the angle through which a light beam is swung by the scanning mirror be made smaller than the angle of view of the eyepiece optical system (EL). This makes it possible to secure an angle of view greater than the angle through which a light ray is swung by the scanning mirror. By reducing the swing angle of the scanning mirror, scanning can be performed at high speed. This makes is possible to achieve a wider angle of view and higher-resolution image display. Furthermore, it is preferable that the beam diameter of a light beam to be scanned be made smaller than the pupil diameter of the eyepiece optical system (EL). To obtain an appropriate pupil diameter, it is advisable to adopt an arrangement in which a light beam is made to diverge by the dispersive power of the reflection-type screen. This helps reduce the diameter of the scanning mirror and thereby make it possible to perform scanning at high speed, achieving a wider angle of view and higher-resolution image display.

EXAMPLE

Figure 7:
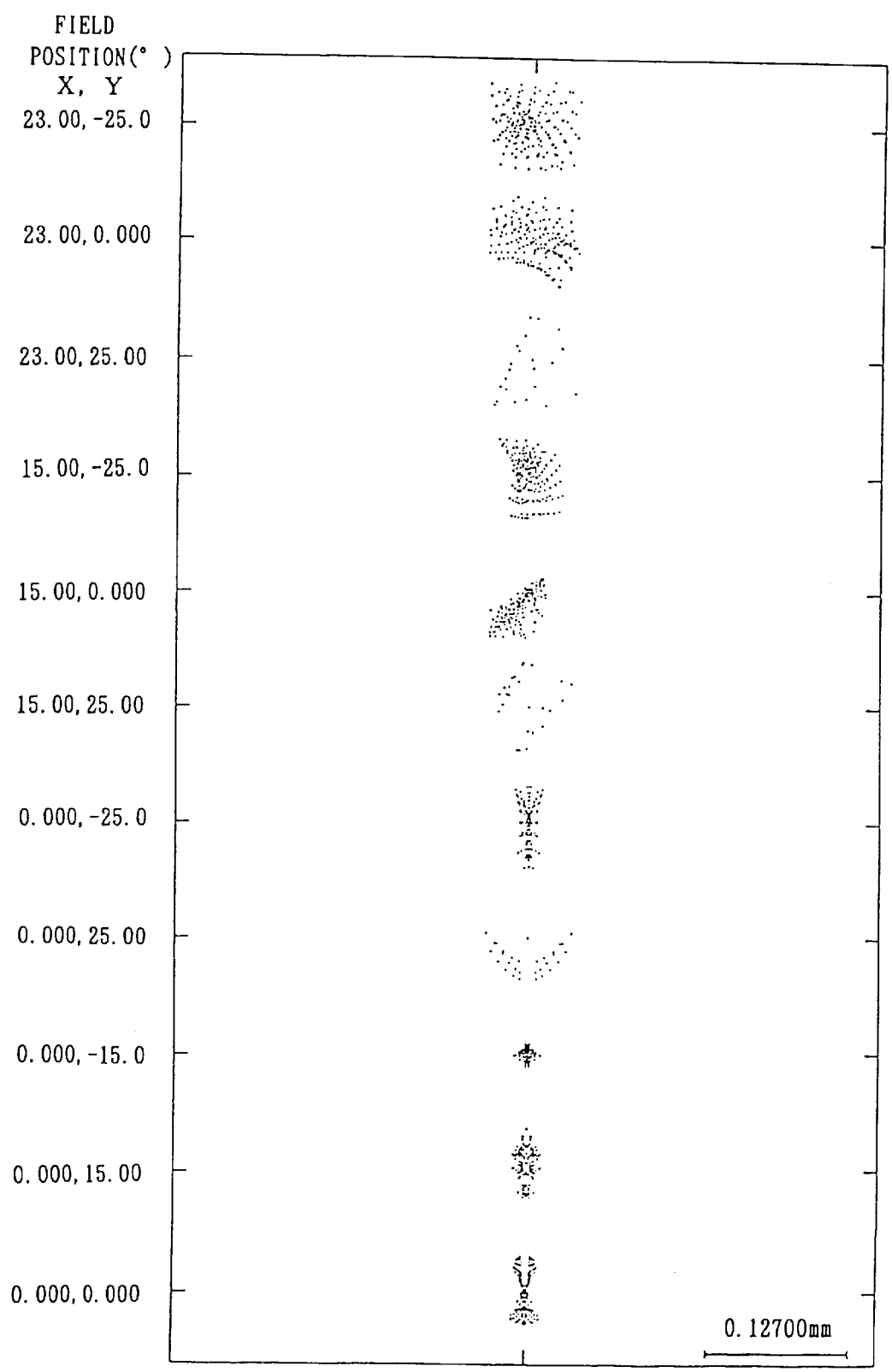
FIG. 7 is a spot diagram of the eyepiece optical system employed in Example 1.
Figure 8:
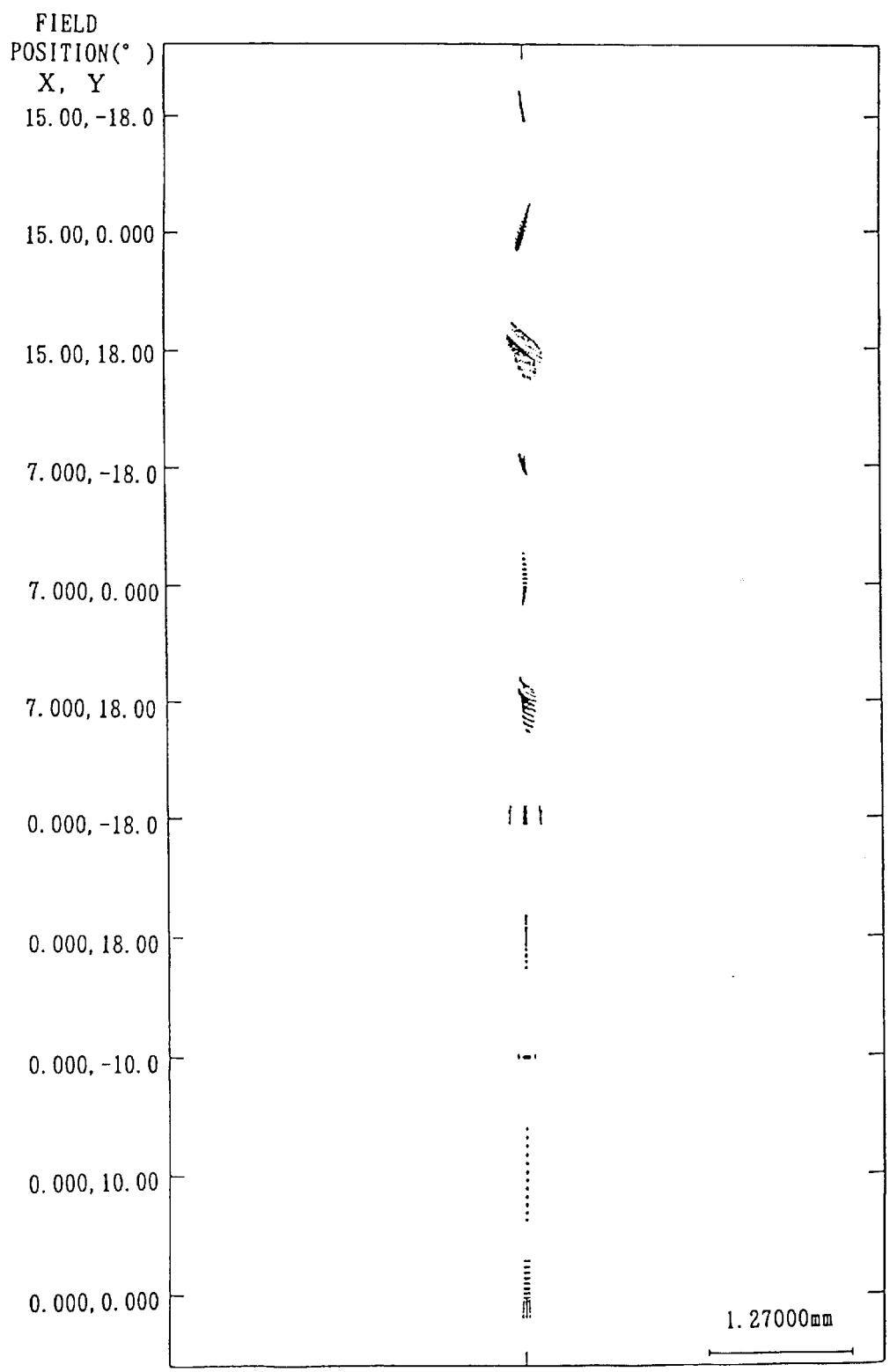
FIG. 8 is a spot diagram of the projecting optical system employed in Example 1.
Figure 9:
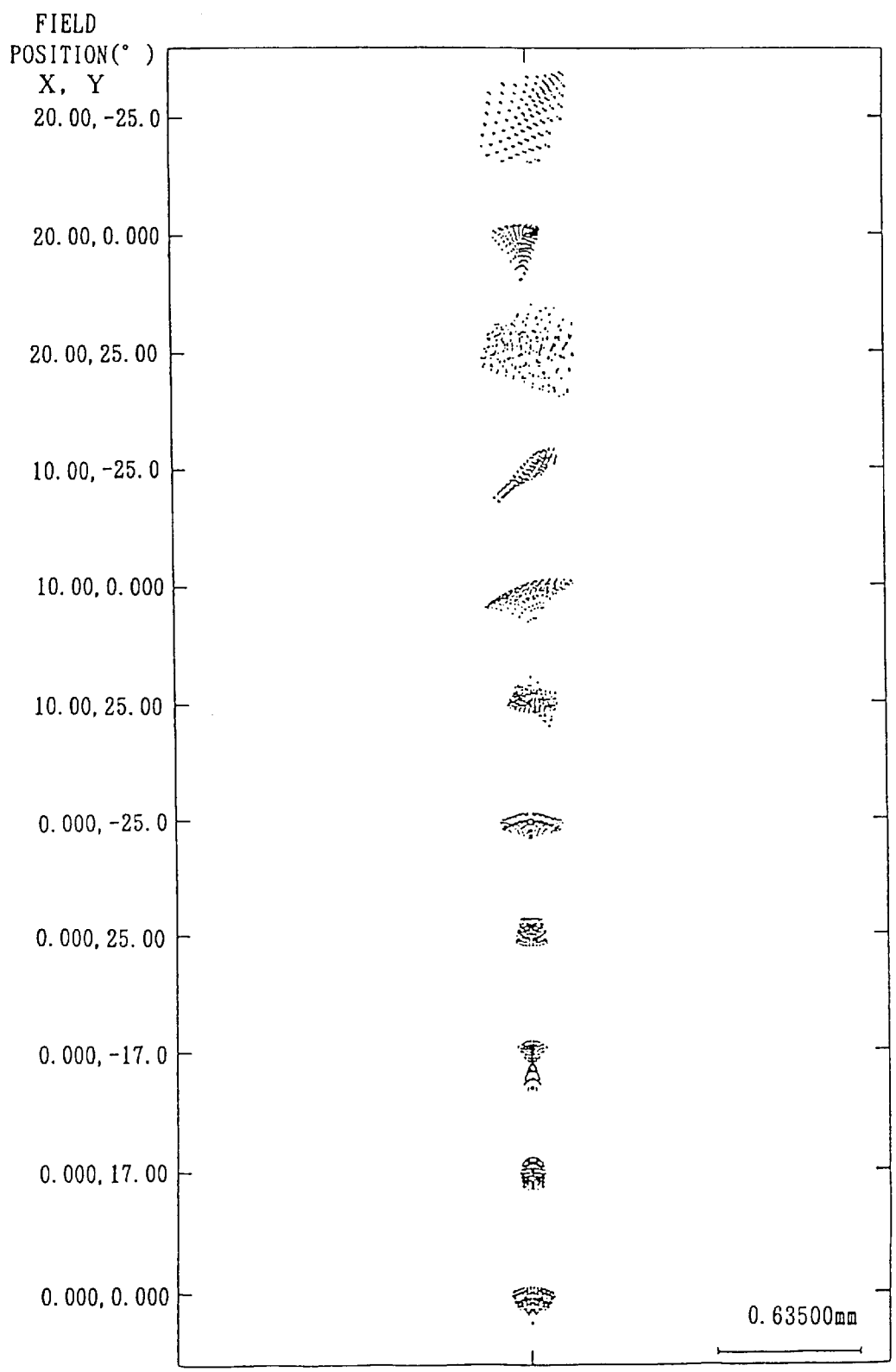
FIG. 9 is a spot diagram of the eyepiece optical system employed in Example 2.
Figure 10:
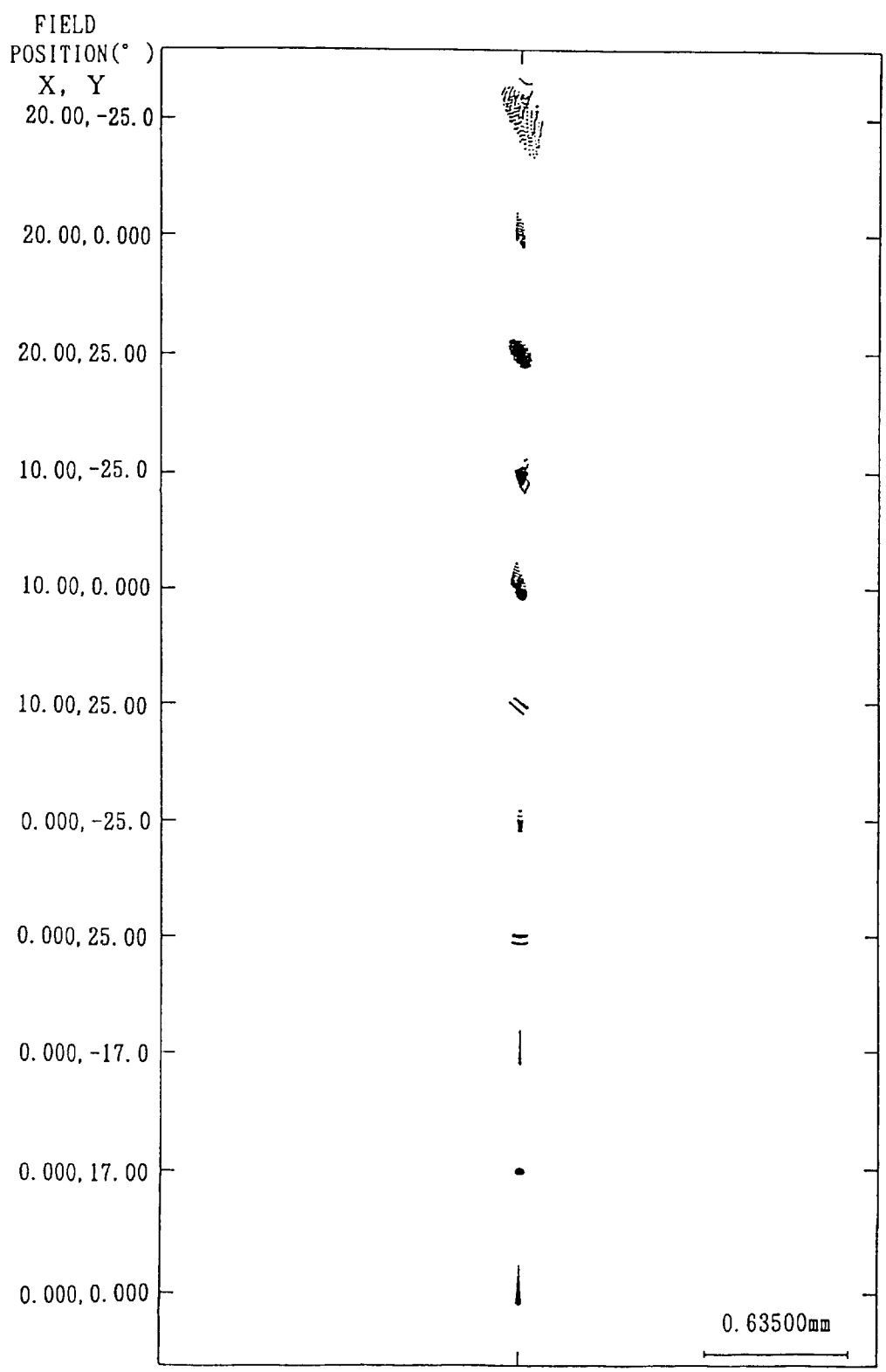
FIG. 10 is a spot diagram of the projecting optical system employed in Example 2.
Figure 11:
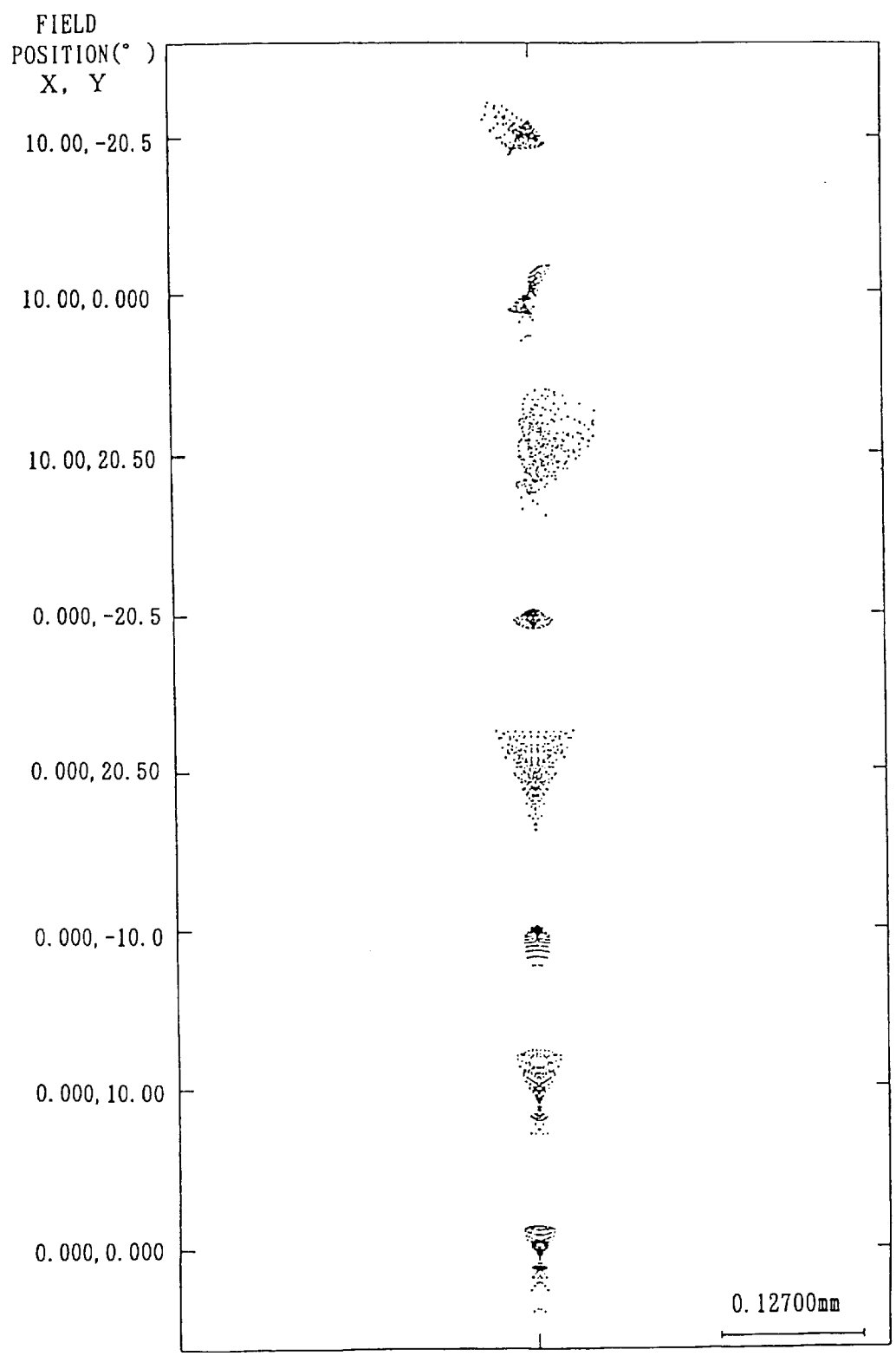
FIG. 11 is a spot diagram of the eyepiece optical system employed in Example 3.
Figure 12:
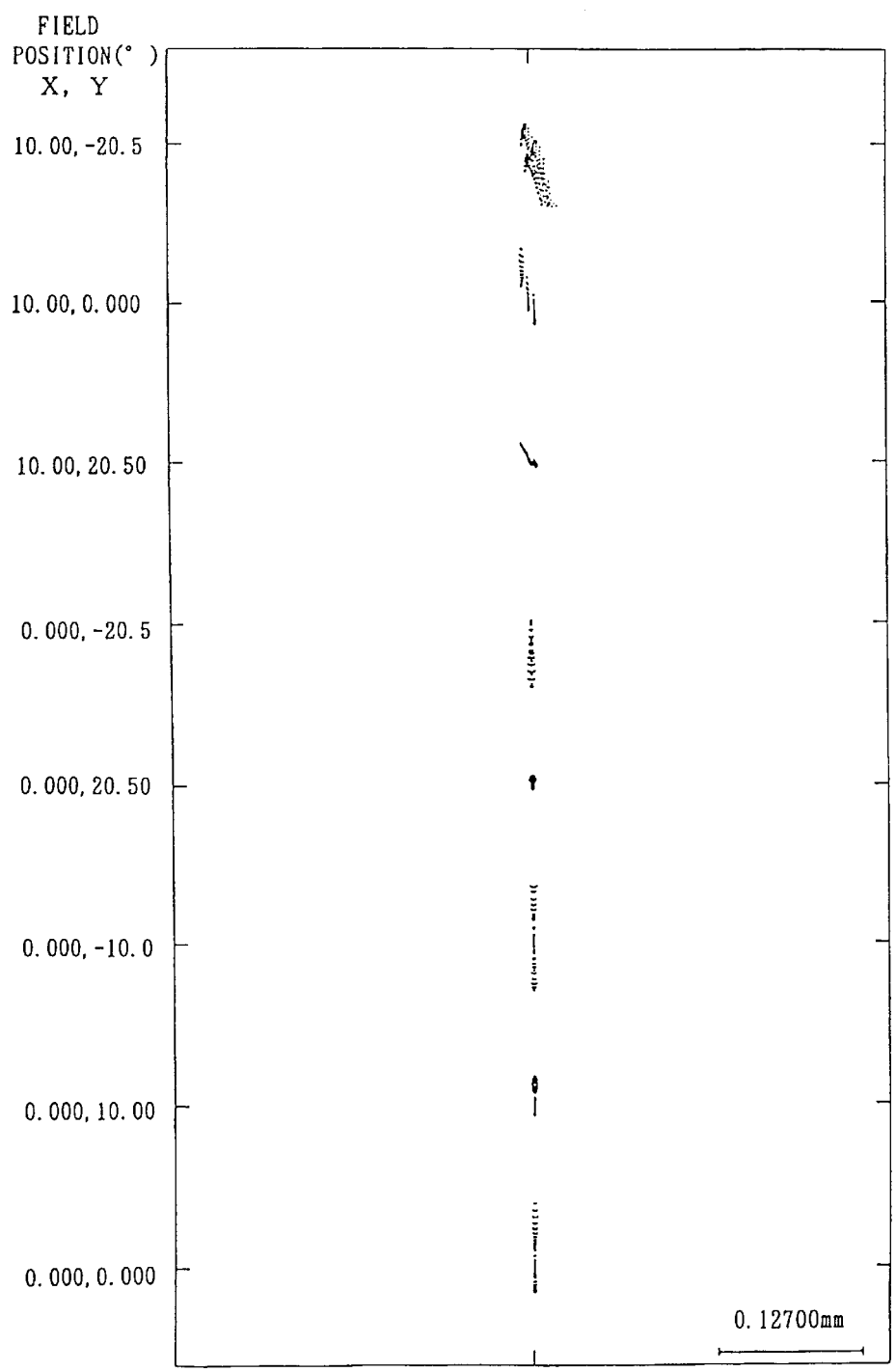
FIG. 12 is a spot diagram of the projecting optical system employed in Example 3.
Figure 19:
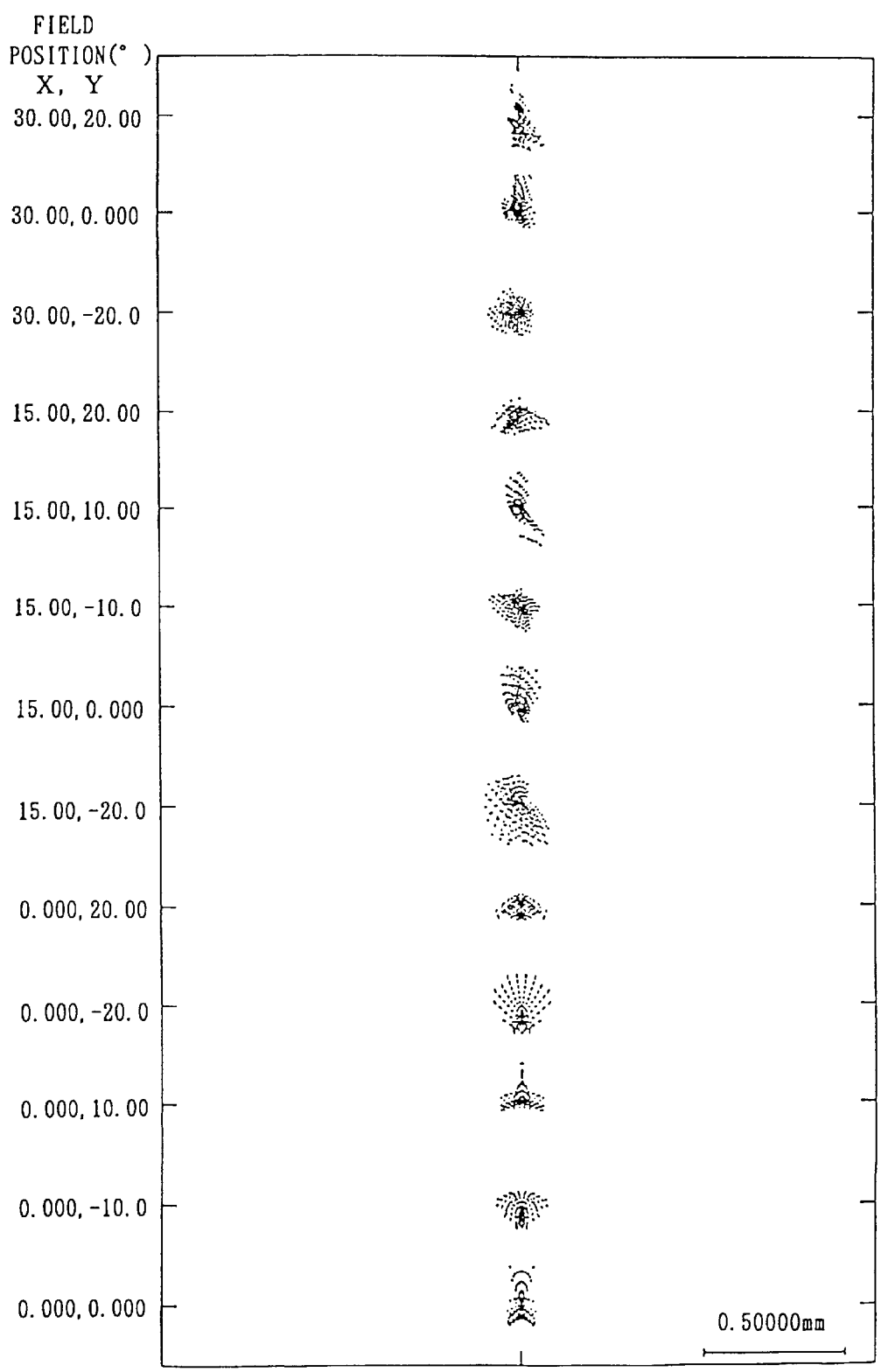
FIG. 19 is a spot diagram of the eyepiece optical system employed in Example 4.
Figure 20:
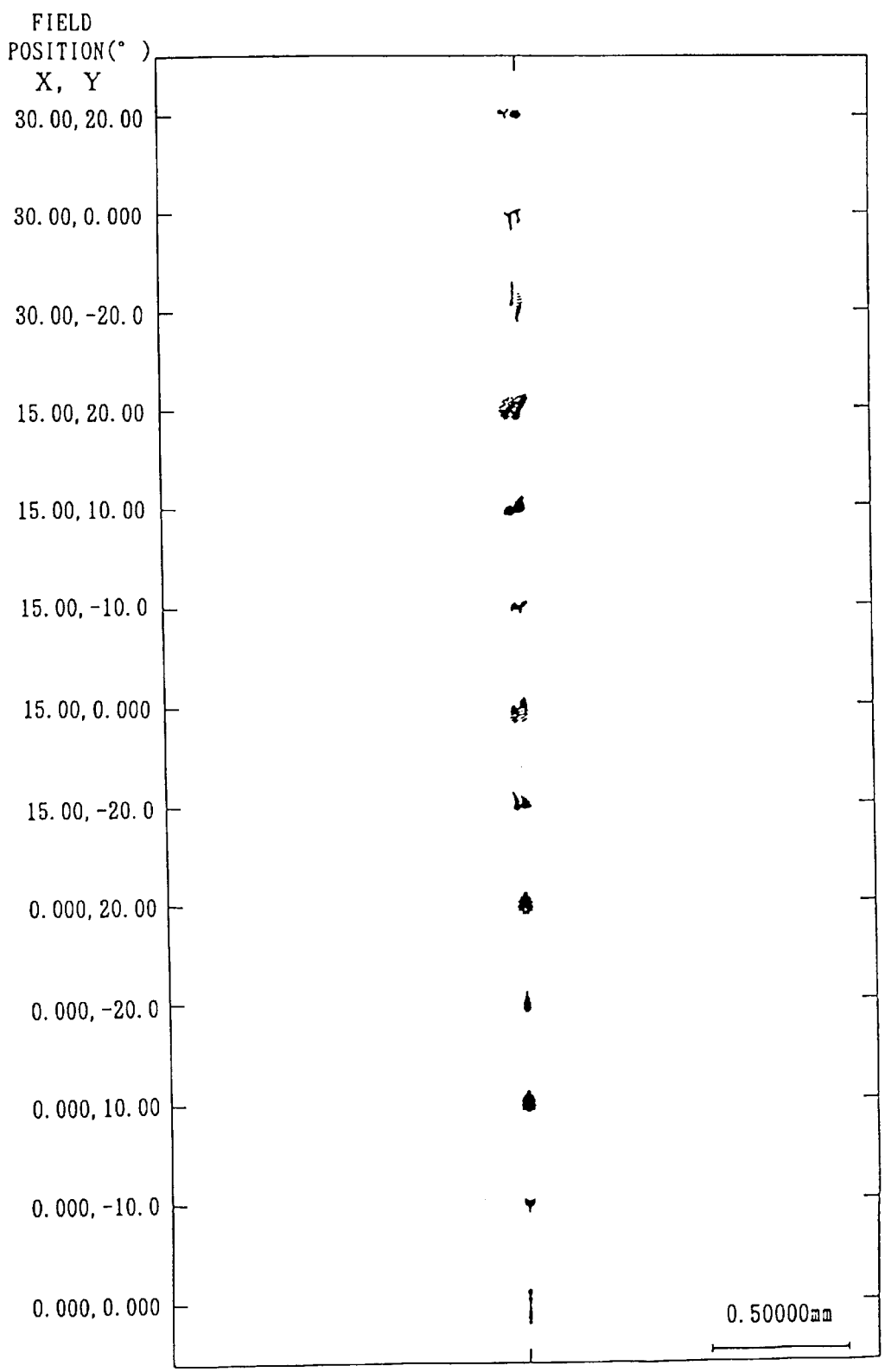
FIG. 20 is a spot diagram of the projecting optical system employed in Example 4.
Figure 21:
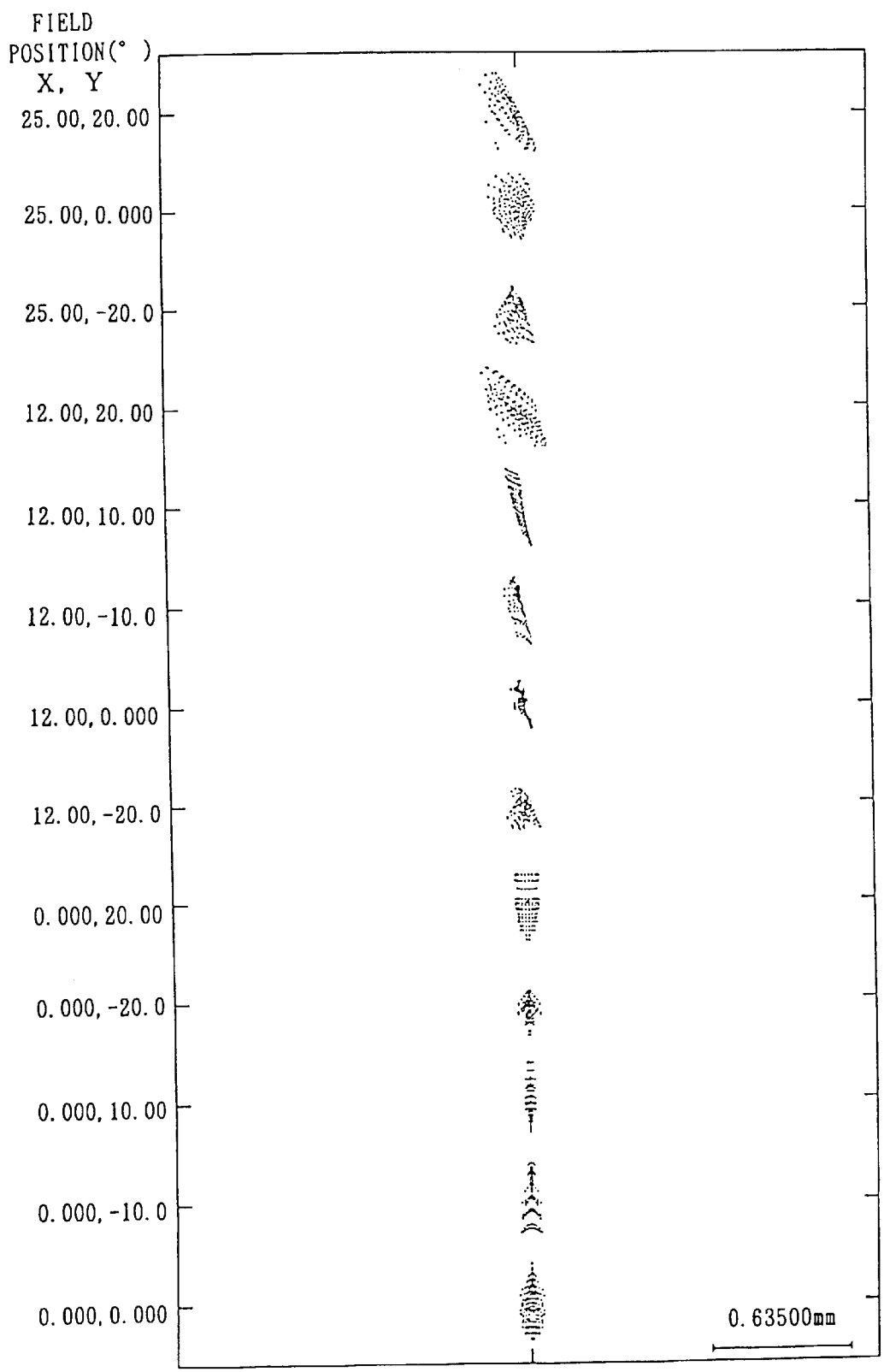
FIG. 21 is a spot diagram of the eyepiece optical system employed in Example 5.
Figure 22:
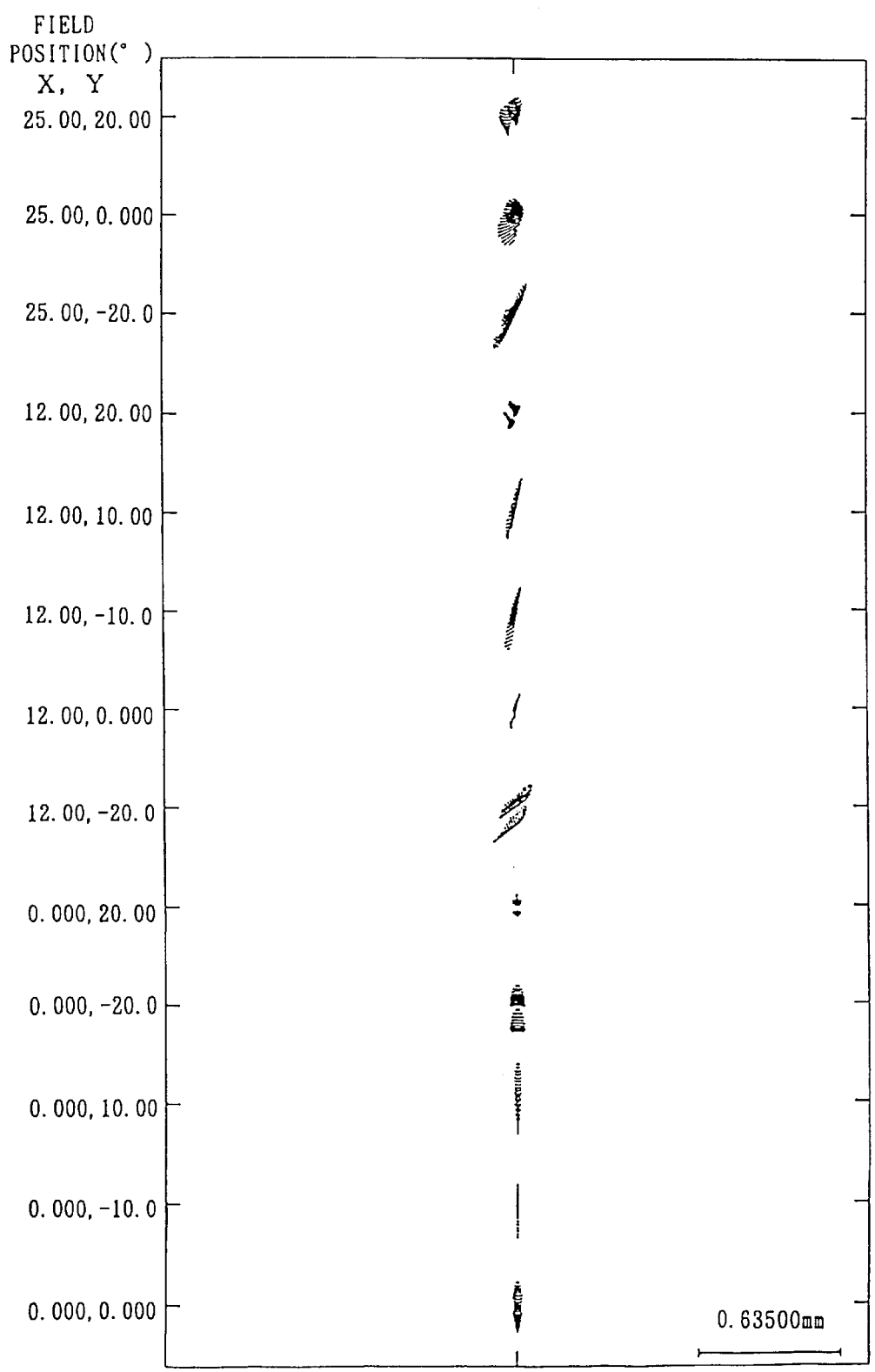
FIG. 22 is a spot diagram of the projecting optical system employed in Example 5.
Figure 23:
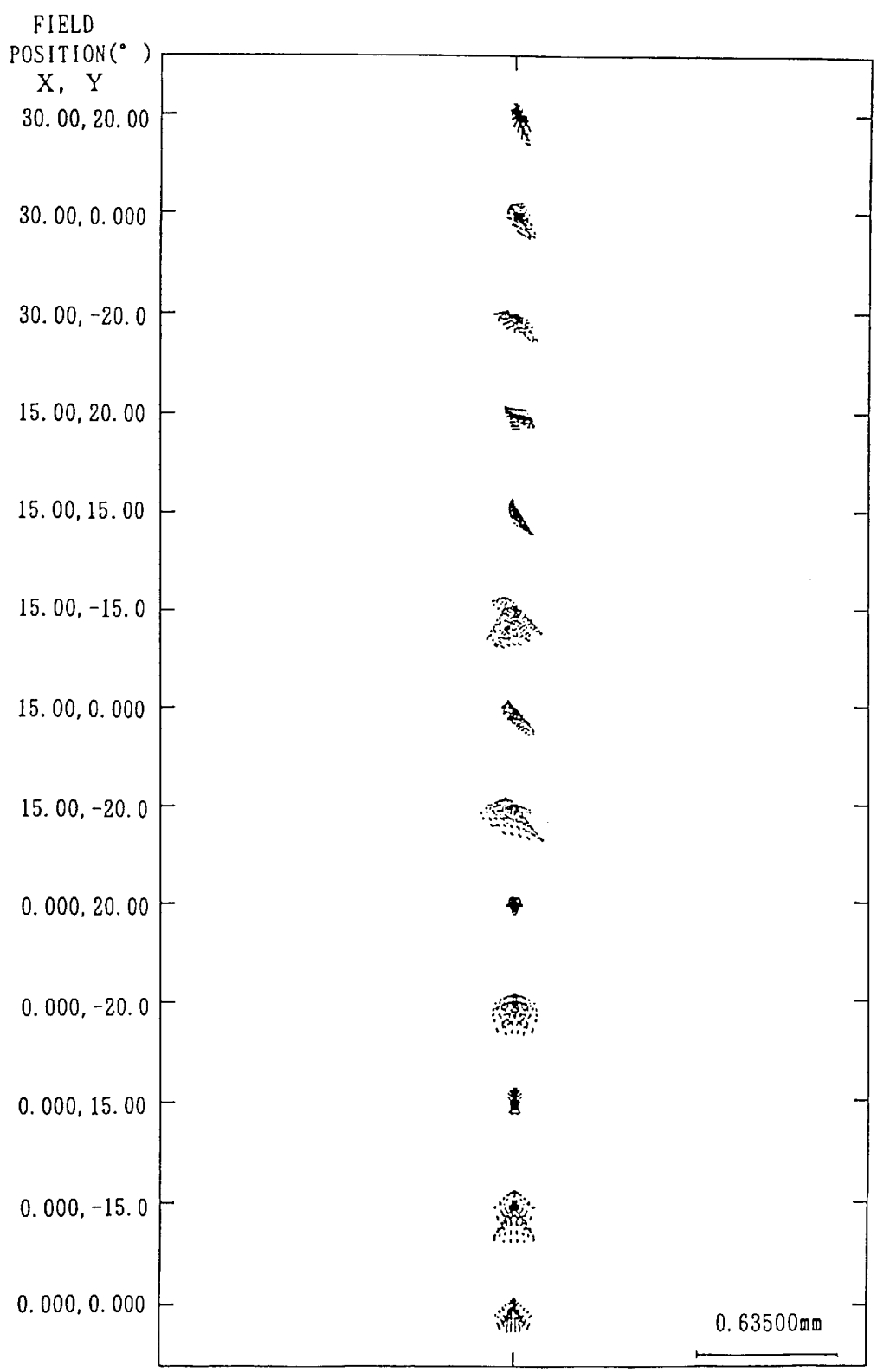
FIG. 23 is a spot diagram of the eyepiece optical system employed in Example 6.
Figure 24:
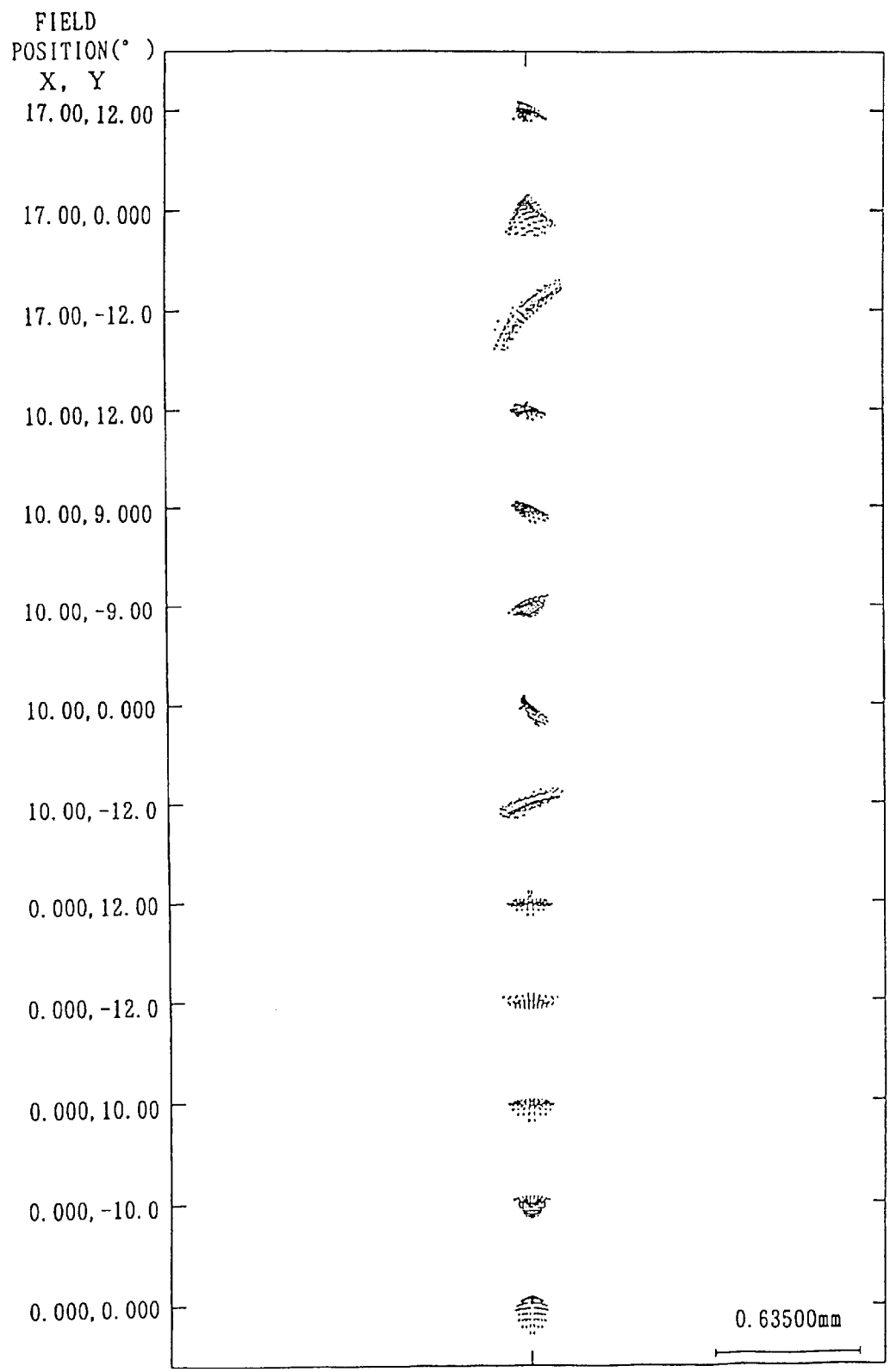
FIG. 24 is a spot diagram of the projecting optical system employed in Example 6.

Hereinafter, practical optical arrangements (Examples 1 to 6) of the image display apparatuses embodying the present invention will be presented with reference to the construction data and the spot diagrams of their eyepiece and projecting optical systems (EL and PL). Tables 1, 3, 5, 7, 9, and 11 list the construction data of the eyepiece optical system (EL) employed in Examples 1 to 6, respectively, and Tables 2, 4, 6, 8, 10, and 12 list the construction data of the projecting optical system (PL) employed in Examples 1 to 6, respectively. FIGS. 7, 9, 11, 19, 21, and 23 are spot diagrams of the eyepiece optical system (EL) employed in Examples 1 to 6, respectively, and FIGS. 8, 10, 12, 20, 22, and 24 are spot diagrams of the projecting optical system (PL) employed in Examples 1 to 6, respectively. Examples 1 to 6 respectively correspond to the first to sixth embodiments described above. FIGS. 1, 3, 5, 13, 15, 17, and FIGS. 2, 4, 6, 14, 16, 18 which respectively show the optical arrangement of the eyepiece and projecting optical systems (EL and EP) employed in the first to sixth embodiments, illustrate the optical arrangement of Examples 1 to 6, respectively. Moreover, the spot diagrams show the imaging characteristics of the eyepiece and projecting optical systems (EL and PL) employed in Examples 1 to 6, with field positions given as angles of view (°).

In the construction data of the eyepiece and projecting optical systems (EL and PL) of each example, Si (i=1, 2, 3, . . . ) represents the ith surface counted from the pupil (E1 and E2) side in the optical system including the pupil (E1 and E2) and the image plane (I), ri (i=1, 2, 3, . . . ) represents the radius of curvature of the surface Si, di (i=1, 2, 3, . . . ) represents the ith axial distance counted from the pupil (E1 and E2) side in the optical system including the pupil (E1 and E2) and the image plane (I), and Ni (i=1, 2, 3, . . . ) and vi (i=1, 2, 3, . . . ) respectively represent the refractive index (Nd) for the d line and the Abbe number (vd) of the ith optical element counted from the pupil (E1 and E2) side.

Unless otherwise indicated, for each set of rectangular coordinates, given as X, Y, and Z, the position of the front-end surface as translationally decentered is represented by the coordinates of its vertex (XDE, YDE, and ZDE) (which respectively represent the position translationally decentered in the X direction, the position translationally decentered in the Y direction, and the position translationally decentered in the Z direction), as determined when the direction perpendicular to the pupil (E1 or E2) is used as the Z direction and the center of the pupil (E1 or E2) is used as the origin (0, 0, 0). In a case where rotational decentering is involved, the rotation angle (°) about the X axis as calculated using the vertex of the surface as the origin is given as ADE. Also listed are the diameter of the pupil (E1) and the angle of view, the diameter of the pupil (E2) and the projection angle (°), and other data. Note that, in the construction data of Examples in which the whole of the eyepiece and projecting optical systems (EL and PL) are used as the shared optical system (CL), overlapping data will be omitted.

A surface Si marked with an asterisk (*) is an aspherical surface, whose surface shape is defined by Formula (AS) below (relative to the vertex). A surface Si marked with # is an anamorphic aspherical surface, whose surface shape is defined by Formula (AN) below (relative to the vertex). Also listed are the aspherical surface data and the anamorphic aspherical surface data.

$$Z=(c \cdot h^2)/[1+\sqrt{1-(1+K) \cdot c^2 \cdot h^2}]+(A \cdot h^4+B \cdot h^6+C \cdot h^8+D \cdot h^{10}) \quad \text{(AS)}$$

$$Z=(CUX \cdot X^2+CUY \cdot Y^2)/[1+\sqrt{1-(1+KX) \cdot CUX^2 \cdot X^2-(1+KY) \cdot CUY^2 \cdot Y^2}]$$
$$+AR\{(1-AP) \cdot X^2+(1+AP) \cdot Y^2\}^2+BR\{(1-BP) \cdot X^2+(1+BP) \cdot Y^2\}^3$$
$$+CR\{(1-CP) \cdot X^2+(1+CP) \cdot Y^2\}^4+DR\{(1-DP) \cdot X^2+(1+DP) \cdot Y^2\}^5 \quad \text{(AN)}$$

where
- Z represents the displacement from the reference surface in the optical axis direction;
- h represents the height in a direction perpendicular to the optical axis;
- c represents the paraxial curvature;
- K, A, B, C, and D represent the aspherical coefficients;
- KY, KX, RY, RX, AR, BR, CR, DR, AP, BP, CP, and DP represent the anamorphic aspherical coefficients;
- CUY=1/RY; and
- CUX=1/RX.

TABLE 1

<<Construction Data of Eyepiece Optical System (EL) of Example 1>>
Pupil Diameter (mm) = φ8.0
Angle of View (°): 45(X Direction) × 50(Y Direction)

| Surface | Radius of Curvature | Axial Distance | Refractive Index | Abbe Number |
|---|---|---|---|---|
| S1(E1) | r1 = ∞ | | | |
| S2# | (XDE,YDE,ZDE) = (0.0,−9.0,10.0) | | | |
| | r2 = 35.126 | | | |
| | | d2 = 5.0 | N1 = 1.750 | v1 = 50.00 |
| S3 | r3 = 110.105 | | | |
| | | d3 = 0.01 | | |
| S4# | r4 = 54.187 | | | |
| | | d4 = 14.46 | N2 = 1.750 | v2 = 50.00 |
| S5# | r5 = −50.311 | | | |
| | | d5 = 0.1 | | |
| S6 | r6 = 72.275 | | | |
| | | d6 = 1.0 | N3 = 1.847 | v3 = 23.80 |
| S7 | r7 = 19.669 | | | |
| | | d7 = 20.295 | N4 = 1.666 | v4 = 55.72 |
| S8# | r8 = −30.394 | | | |
| | | d8 = 9.142 | | |
| S9(I) | r9 = −36.091 | | | |

[Anamorphic Aspherical Surface Data of Second Surface (S2)]

KY = −4.590, KX = −3.499, RX = 26.688
AR = 0.8827 × $10^{−7}$, BR = −0.2333 × $10^{−7}$, CR = 0.5703 × $10^{−10}$, DR = −0.3919 × $10^{−13}$
AP = −2.578, BP = 0.07136, CP = 0.01293 , DP = −0.05008

[Anamorphic Aspherical Surface Data of Fourth Surface (S4)]

KY = −28.658, KX = −139.600, RX = 128.182
AR = 0.3236 × $10^{−4}$, BR = −0.3124 × $10^{−7}$, CR = 0.1510 × $10^{−10}$, DR = 0.1994 × $10^{−14}$
AP = 0.003902, BP = 0.04664, CP = 0.03435, DP = 0.09920

[Anamorphic Aspherical Surface Data of Fifth Surface (S5)]

KY = −4.261 × $10^7$, KX = −4.261 × $10^7$, RX = 0.016897
AR = 0.1830 × $10^{−4}$, BR = −0.4299 × $10^{−7}$, CR = 0.5337 × $10^{−10}$, DR = −0.2492 × $10^{−13}$
AP = −0.1803, BP = 0.03497, CP = 0.05517, DP = 0.02056

[Anamorphic Aspherical Surface Data of Eighth Surface (S8)]

KY = −45.633, KX = −28.118, RX = −29.738
AR = −0.3973 × $10^{−4}$, BR = 0.6667 × $10^{−7}$, CR = 0.2597 × $10^{−9}$, DR = −0.3704 × $10^{−12}$
AP = 0.02176, BP = 0.2600, CP = 0.004092, DP = 0.1711

TABLE 2

<<Construction Data of Projecting Optical System (PL) of Example 1>>
Pupil Diameter (mm) = φ2.0
Angle of View (°): 30(X Direction) × 36(Y Direction)

| Surface | Radius of Curvature | Axial Distance | Refractive Index | Abbe Number |
|---|---|---|---|---|
| S1(E2) | r1 = ∞ | | | |
| S2# | (XDE,YDE,ZDE) = (0.0,11.995,20.0) | | | |
| | r2 = 60.161 | | | |
| | | d2 = 5.0 | N1 = 1.640 | v1 = 58.12 |
| S3 | r3 = 51.886 | | | |
| | | d3 = 0.1 | | |

TABLE 2-continued

<<Construction Data of Projecting Optical System (PL) of Example 1>>
Pupil Diameter (mm) = φ2.0
Angle of View (°): 30(X Direction) × 36(Y Direction)

| Surface | Radius of Curvature | Axial Distance | Refractive Index | Abbe Number |
|---|---|---|---|---|
| S4# | r4 = 7.777 | | | |
| | | d4 = 5.0 | N2 = 1.704 | ν2 = 52.58 |
| S5 | r5 = 30.054 | | | |
| S6# | (XDE,YDE,ZDE) = (0.0,13.0,33.0) | | | |
| | r6 = 54.187 | | | |
| | | d6 = 14.46 | N3 = 1.750 | ν3 = 50.00 |
| S7# | r7 = −50.311 | | | |
| | | d7 = 0.1 | | |
| S8 | r8 = 72.275 | | | |
| | | d8 = 1.0 | N4 = 1.847 | ν4 = 23.80 |
| S9 | r9 = 19.669 | | | |
| | | d9 = 20.295 | N5 = 1.666 | ν5 = 55.72 |
| S10# | r10 = −30.394 | | | |
| | | d10 = 9.142 | | |
| S11(I) | r11 = −36.091 | | | |

[Anamorphic Aspherical Surface Data of Second Surface (S2)]

KY = −6.774, KX = −5.007, RX = 16.489
AR = 0.1439 × $10^{-4}$, BR = −0.8091 × $10^{-8}$, CR = −0.6594 × $10^{-11}$, DR = 0.6299 × $10^{-14}$
AP = 0.2091, BP = 0.2388, CP = 0.1225, DP = 0.1934

[Anamorphic Aspherical Surface Data of Fourth Surface (S4)]

KY = −4.590, KX = 0.1227, RX = 58.134
AR = 0.1389 × $10^{-4}$, BR = −0.1615 × $10^{-7}$, CR = 0.2534 × $10^{-10}$, DR = −0.1162 × $10^{-13}$
AP = −0.7779, BP = −0.5058, CP = 0.007286, DP = 0.04087

[Anamorphic Aspherical Surface Data of Sixth Surface (S6)]

KY = −28.658, KX = −139.600, RX = 128.182
AR = 0.3236 × $10^{-4}$, BR = −0.3124 × $10^{-7}$, CR = 0.1510 × $10^{-10}$, DR = 0.1994 × $10^{-14}$
AP = 0.003902, BP = 0.04664, CP = 0.03435, DP = 0.09920

[Anamorphic Aspherical Surface Data of Seventh Surface (S7)]

KY = −4.261 × $10^{7}$, KX = −4.261 × $10^{7}$, RX = 0.016897
AR = 0.1830 × $10^{-4}$, BR = −0.4299 × $10^{-7}$, CR = 0.5337 × $10^{-10}$, DR = −0.2492 × $10^{-13}$
AP = −0.1803, BP = 0.03497, CP = 0.05517, DP = 0.02056

[Anamorphic Aspherical Surface Data of Tenth Surface (S10)]

KY = −45.633, KX = −28.118, RX = −29.738
AR = −0.3973 × $10^{-4}$, BR = 0.6667 × $10^{-7}$, CR = 0.259 × $10^{-9}$, DR = −0.3704 × $10^{-12}$
AP = 0.02176, BP = 0.2600, CP = 0.004092, DP = 0.1711

TABLE 3

<<Construction Data of Eyepiece Optical System (EL) of Example 2>>
Pupil Diameter (mm) = φ10.0
Angle of View (°): 40(X Direction) × 50(Y Direction)

| Surface | Radius of Curvature | Axial Distance | Refractive Index | Abbe Number |
|---|---|---|---|---|
| S1(El) | r1 = ∞ | | | |
| S2* | (XDE,YDE,ZDE) = (0.0,−9.0,10.0) | | | |
| | r2 = 30.037 | | | |
| | | d2 = 5.0 | N1 = 1.750 | ν1 = 50.00 |
| S3 | r3 = 128.107 | | | |
| | | d3 = 0.5 | | |
| S4* | r4 = 13691.239 | | | |
| | | d4 = 3.846 | N2 = 1.822 | ν2 = 27.14 |
| S5* | r5 = −28.271 | | | |
| | | d5 = 5.170 | | |
| S6 | r6 = 186.957 | | | |
| | | d6 = 1.0 | N3 = 1.847 | ν3 = 23.80 |

TABLE 3-continued

<<Construction Data of Eyepiece Optical System (EL) of Example 2>>
Pupil Diameter (mm) = φ10.0
Angle of View (°): 40(X Direction) × 50(Y Direction)

| Surface | Radius of Curvature | Axial Distance | Refractive Index | Abbe Number |
|---|---|---|---|---|
| S7 | r7 = 24.143 | | | |
| | | d7 = 20.285 | N4 = 1.750 | ν4 = 50.00 |
| S8* | r8 = −25.509 | | | |
| | | d8 = 14.199 | | |
| S9(I) | r9 = ∞ | | | |

[Aspherical Surface Data of Second Surface (S2)]

K = −0.4557
A = −0.1789 × $10^{-5}$
B = −0.5019 × $10^{-7}$
C = 0.6971 × $10^{-10}$
D = −0.2216 × $10^{-13}$

[Aspherical Surface Data of Fourth Surface (S4)]

K = 1.611 × $10^{5}$
A = 0.3867 × $10^{-4}$
B = −0.3707 × $10^{-7}$
C = 0.2498 × $10^{-10}$
D = −0.2251 × $10^{-13}$

[Aspherical Surface Data of Fifth Surface (S5)]

K = −4.261 × $10^{7}$
A = 0.4583 × $10^{-4}$
B = −0.8942 × $10^{-7}$
C = 0.7670 × $10^{-10}$
D = −0.3552 × $10^{-13}$

[Aspherical Surface Data of Eighth Surface (S8)]

K = −9.259
A = −0.1544 × $10^{-4}$
B = 0.2483 × $10^{-7}$
C = −0.6585 × $10^{-11}$
D = 0.1234 × $10^{-13}$

TABLE 4

<<Construction Data of Projecting Optical System (PL) of Example 2>>

Pupil Diameter (mm) = φ2.0
Projection Angle (°): 40(X Direction) × 50(Y Direction)
S2: YDE = 13.0

TABLE 5

<<Construction Data of Eyepiece Optical System (EL) of Example 3>>
Pupil Diameter (mm) = φ10.0
Angle of View (°): 20(X Direction) × 40(Y Direction)

| Surface | Radius of Curvature | Axial Distance | Refractive Index | Abbe Number |
|---|---|---|---|---|
| S1(El) | r1 = ∞ | | | |
| S2* | (XDE,YDE,ZDE) = (0.0,−8.0,15.0) | | | |
| | r2 = 21.975 | | | |
| | | d2 = 19.397 | N1 = 1.535 | ν1 = 65.81 |
| S3* | r3 = 31.854 | | | |
| | | d3 = 0.1 | | |
| S4 | r4 = 27.386 | | | |
| | | d4 = 1.0 | N2 = 1.847 | ν2 = 23.80 |
| S5 | r5 = 14.879 | | | |
| | | d5 = 16.803 | N3 = 1.620 | ν3 = 60.30 |
| S6* | r6 = −61.994 | | | |
| | | d6 = 7.701 | | |
| S7(I) | r7 = −31.451 | | | |

TABLE 5-continued

<<Construction Data of Eyepiece Optical System (EL) of Example 3>>
Pupil Diameter (mm) = φ10.0
Angle of View (°): 20(X Direction) × 40(Y Direction)

| Surface | Radius of Curvature | Axial Distance | Refractive Index | Abbe Number |
|---|---|---|---|---|

[Aspherical Surface Data of Second Surface (S2)]

$K = -0.5817$
$A = -0.7293 \times 10^{-6}$
$B = -0.1681 \times 10^{-7}$
$C = 0.2310 \times 10^{-10}$
$D = -0.8658 \times 10^{-14}$

[Aspherical Surface Data of Third Surface (S3)]

$K = -1.985 \times 10^{7}$
$A = 0.6040 \times 10^{-5}$
$B = -0.5066 \times 10^{-7}$
$C = 0.1047 \times 10^{-9}$
$D = -0.6469 \times 10^{-13}$

[Aspherical Surface Data of Sixth Surface (S6)]

$K = -0.08732$
$A = 0.18511 \times 10^{-4}$
$B = 0.7834 \times 10^{-7}$
$C = -0.4007 \times 10^{-9}$
$D = 0.1891 \times 10^{-12}$

TABLE 6

<<Construction Data of Projecting Optical System (PL) of Example 3>>

Pupil Diameter (mm) = φ2.0
Projection Angle (°): 20(X Direction) × 40(Y Direction)
S2: YDE = 12.0

TABLE 7

<<Construction Data of Eyepiece Optical System (EL) of Example 4>>
Pupil Diameter (mm) = φ10.0
Angle of View (°): 60(X Direction) × 40(Y Direction)

| Surface | Radius of Curvature | Axial Distance | Refractive Index | Abbe Number |
|---|---|---|---|---|
| S1(E1) | r1 = ∞ | | | |
| S2# | (XDE,YDE,ZDE) = (0.0,-35.0,23.457) | | | |
| | r2 = -3.006 × 10$^6$ | | | |
| | | d2 = 16.014 | N1 = 1.754 | ν1 = 47.35 |
| S3# | r3 = -226.647 | | | |
| | | d3 = 33.481 | | |
| S4# | r4 = -109.114 | | | |
| | | d4 = 2.048 | N2 = 1.545 | ν2 = 47.14 |
| S5# | Reflecting Surface (RS) | | | |
| | r5 = -117.460 | | | |
| | | d5 = -2.048 | N3 = 1.545 | ν3 = 47.14 |
| S6# | r6 = -109.114 | | | |
| | | d6 = -33.481 | | |
| S7# | r7 = -226.647 | | | |
| | | d7 = -16.014 | N4 = 1.754 | ν4 = 47.35 |
| S8# | r8 = -3.006 × 10$^6$ | | | |
| | | d8 = -3.457 | | |
| S9(I) | r9 = -91.062 | | | |

[Anamorphic Aspherical Surface Data of Second and Eighth Surfaces (S2 and S8)]

$KY = 3.450 \times 10^{9}$, $KX = 8.917$, $RX = -148.216$
$AR = -0.2511 \times 10^{-7}$, $BR = -0.2613 \times 10^{-12}$, $CR = -0.6402 \times 10^{-14}$, $DR = 0.4553 \times 10^{-23}$
$AP = 5.289$, $BP = -11.999$, $CP = 1.056$, $DP = -17.301$

TABLE 7-continued

<<Construction Data of Eyepiece Optical System (EL) of Example 4>>
Pupil Diameter (mm) = φ10.0
Angle of View (°): 60(X Direction) × 40(Y Direction)

| Surface | Radius of Curvature | Axial Distance | Refractive Index | Abbe Number |
|---|---|---|---|---|

[Anamorphic Aspherical Surface Data of Third and Seventh Surfaces (S3 and S7)]

$KY = -1.000$, $KX = 5.284$, $RX = -146.362$
$AR = -0.3593 \times 10^{-6}$, $BR = -0.2107 \times 10^{-11}$, $CR = -0.2856 \times 10^{-13}$, $DR = -0.9507 \times 10^{-18}$
$AP = -0.5028$, $BP = -3.485$, $CP = -1.202$, $DP = -0.1230$

[Anamorphic Aspherical Surface Data of Fourth and Sixth Surfaces (S4 and S6)]

$KY = -0.09982$, $KX = 5.111$, $RX = -121.773$
$AR = -0.7329 \times 10^{-7}$, $BR = 0.7110 \times 10^{-13}$, $CR = -0.4442 \times 10^{-14}$, $DR = 0.6537 \times 10^{-23}$
$AP = -0.8770$, $BP = -7.185$, $CP = -1.022$, $DP = 5.503$

[Anamorphic Aspherical Surface Data of Fifth Surface (S5)]

$KY = 0.2038$, $KX = 1.830$, $RX = -117.829$
$AR = -0.7954 \times 10^{-7}$, $BR = 0.4164 \times 10^{-11}$, $CR = -0.1045 \times 10^{-17}$, $DR = -0.1190 \times 10^{-18}$
$AP = 0.4525$, $BP = 0.3462$, $CP = 5.865$, $DP = 0.97944$

TABLE 8

<<Construction Data of Projecting Optical System (PL) of Example 4>>

Pupil Diameter (mm) = φ4.0
Projection Angle (°): 60(X Direction) × 40(Y Direction)
S2: YDE = 35.0

TABLE 9

<<Construction Data of Eyepiece Optical System (EL) of Example 5>>
Pupil Diameter (mm) = φ8.0
Angle of View (°): 50(X Direction) × 40(Y Direction)

| Surface | Radius of Curvature | Axial Distance | Refractive Index | Abbe Number |
|---|---|---|---|---|
| S1(E1) | r1 = ∞ | | | |
| S2# | (XDE,YDF,ZDE) = (0.0,-35.0,21.800) | | | |
| | r2 = -3.091 × 10$^6$ | | | |
| | | d2 = 14.288 | N1 = 1.650 | ν1 = 57.10 |
| S3# | r3 = -273.738 | | | |
| | | d3 = 21.005 | | |
| S4# | r4 = -109.837 | | | |
| | | d4 = 4.845 | N2 = 1.487 | ν2 = 70.40 |
| S5# | r5 = -107.020 | | | |
| | | d5 = 10.104 | | |
| S6# | r6 = -106.466 | | | |
| | | d6 = 2.958 | N3 = 1.495 | ν3 = 65.43 |
| S7# | Reflecting Surface (RS) | | | |
| | r7 = -113.467 | | | |
| | | d7 = -2.958 | N4 = 1.495 | ν4 = 65.43 |
| S8# | r8 = -106.466 | | | |
| | | d8 = -10.105 | | |
| S9# | r9 = -107.020 | | | |
| | | d9 = -4.845 | N5 = 1.487 | ν5 = 70.40 |
| S10# | r10 = -109.837 | | | |
| | | d10 = -21.005 | | |
| S11# | r11 = -273.738 | | | |
| | | d11 = -14.288 | N6 = 1.650 | ν6 = 57.10 |
| S12# | r12 = 3.091 × 10$^6$ | | | |
| | | d12 = 14.288 | | |
| S13(I) | r13 = -150.630 | | | |

TABLE 9-continued

<<Construction Data of Eyepiece Optical System (EL) of Example 5>>
Pupil Diameter (mm) = φ8.0
Angle of View (°): 50(X Direction) × 40(Y Direction)

| Surface | Radius of Curvature | Axial Distance | Refractive Index | Abbe Number |
|---|---|---|---|---|

[Anamorphic Aspherical Surface Data of Second and Twelfth Surfaces (S2 and S12)]

$KY = 3.585 \times 10^9$, $KX = 7.57$, $RX = -92.3067$
$AR = -0.2830 \times 10^{-7}$, $BR = -0.2987 \times 10^{-12}$, $CR = -0.5184 \times 10^{-14}$, $DR = 0.5823 \times 10^{-23}$
$AP = 5.993$, $BP = -12.485$, $CP = 1.004$, $DP = -18.241$

[Anamorphic Aspherical Surface Data of Third and Eleventh Surfaces (S3 and S11)]

$KY = 3.640$, $KX = 6.365$, $RX = -82.752$
$AR = -0.3196 \times 10^{-6}$, $BR = -0.2816 \times 10^{-11}$, $CR = -0.1061 \times 10^{-13}$, $DR = -0.2105 \times 10^{-17}$
$AP = -0.4918$, $BP = -3.6371$, $CP = -1.8500$, $DP = -0.006019$

[Anamorphic Aspherical Surface Data of Fourth and Tenth Surfaces (S4 and S10)]

$KY = 0.02502$, $KX = 3.919$, $RX = -98.919$
$AR = -0.1628 \times 10^{-6}$, $BR = 0.1094 \times 10^{-12}$, $CR = -0.1423 \times 10^{-14}$, $DR = 0.2352 \times 10^{-22}$
$AP = -0.3338$, $BP = -7.894$, $CP = -2.103$, $DP = 7.261$

[Anamorphic Aspherical Surface Data of Fifth and Ninth Surfaces (S5 and S9)]

$KY = -0.03465$, $KX = 4.247$, $RX = -105.948$
$AR = -0.1090 \times 10^{-6}$, $BR = 0.9879 \times 10^{-13}$, $CR = -0.3334 \times 10^{-15}$, $DR = 0.2543 \times 10^{-22}$
$AP = -0.4688$, $BP = -7.663$, $CP = -1.853$, $DP = 7.392$

[Anamorphic Aspherical Surface Data of Sixth and Eighth Surfaces (S6 and S8)]

$KY = 0.01702$, $KX = 4.216$, $RX = -99.431$
$AR = -0.1677 \times 10^{-6}$, $BR = 0.1023 \times 10^{-12}$, $CR = -0.1104 \times 10^{-14}$, $DR = 0.2162 \times 10^{-22}$
$AP = -0.3357$, $BP = -7.746$, $CP = -2.050$, $DP = 7.172$

[Anamorphic Aspherical Surface Data of Seventh Surface (S7)]

$KY = 0.1460$, $KX = 1.929$, $RX = -113.015$
$AR = -0.8399 \times 10^{31\ 7}$, $BR = 0.5621 \times 10^{-11}$, $CR = -0.1195 \times 10^{-17}$, $DR = -0.1228 \times 10^{-18}$
$AP = 0.5093$, $BP = 0.4773$, $CP = 6.116$, $DP = 0.1341$

TABLE 10

<<Construction Data of Projecting Optical System (PL) of Example 5>>

Pupil Diameter (mm) = φ8.0
Projection Angle (°): 50(X Direction) × 40(Y Direction)
S2: YDE = 35.0

TABLE 11

<<Construction Data of Eyepiece Optical System (EL) of Example>>
Pupil Diameter (mm) = φ10.0
Angle of View (°): 60(X Direction) × 40(Y Direction)

| Surface | Radius of Curvature | Axial Distance | Refractive Index | Abbe Number |
|---|---|---|---|---|
| S1(E1) | r1 = ∞ | | | |
| S2# | (XDE,YDE,ZDE,ADE) = (0.0,−31.017,27.757,5.807) | | | |
| | r2 = 1.554 × 10⁶ | | | |
| | | d2 = 13.000 | N1 = 1.487 | ν1 = 70.40 |
| S3# | r3 = −311.948 | | | |
| | | d3 = 29.734 | | |

TABLE 11-continued

<<Construction Data of Eyepiece Optical System (EL) of Example>>
Pupil Diameter (mm) = φ10.0
Angle of View (°): 60(X Direction) × 40(Y Direction)

| Surface | Radius of Curvature | Axial Distance | Refractive Index | Abbe Number |
|---|---|---|---|---|
| S4# | r4 = −115.312 | | | |
| | | d4 = 4.509 | N2 = 1.569 | ν2 = 42.30 |
| S5# | Reflecting Surface (RS) | | | |
| | r5 = −122.281 | | | |
| | | d5 = −4.509 | N3 = 1.569 | ν3 = 42.30 |
| S6# | r6 = −115.312 | | | |
| | | d6 = −29.734 | | |
| S7# | r7 = −311.948 | | | |
| | | d7 = −13.000 | N4 = 1.487 | ν4 = 70.40 |
| S8# | r8 = 1.554 × 10⁶ | | | |
| S9(I) | (XDE,YDE,ZDE,ADE) = (0.0,−35.0,20.365,7.583) | | | |
| | r9 = −109.211 | | | |

[Anamorphic Aspherical Surface Data of Second and Eighth Surfaces (S2 and S8)]

$KY = 1.123 \times 10^9$, $KX = -2.334$, $RX = -322.8206$
$AR = -0.2558 \times 10^{-7}$, $BR = -0.2959 \times 10^{-12}$, $CR = -0.4342 \times 10^{-14}$, $DR = 0.8358 \times 10^{-23}$
$AP = 5.621$, $BP = -12.283$, $CP = 0.9380$, $DP = -18.734$

[Anamorphic Aspherical Surface Data of Third and Seventh Surfaces (S3 and S7)]

$KY = 12.517$, $KX = 0.9425$, $RX = -103.358$
$AR = -0.3993 \times 10^{-6}$, $BR = -0.4379 \times 10^{-11}$, $CR = -0.6744 \times 10^{-14}$, $DR = -0.2664 \times 10^{-17}$
$AP = -0.4249$, $BP = -3.985$, $CP = -1.782$, $DP = 0.05751$

[Anamorphic Aspherical Surface Data of Fourth and Sixth Surfaces (S4 and S6)]

$KY = -0.009896$, $KX = 6.076$, $RX = -131.251$
$AR = -0.1693 \times 10^{-6}$, $BR = 0.6337 \times 10^{-13}$, $CR = -0.6797 \times 10^{-16}$, $DR = 0.5734 \times 10^{-23}$
$AP = -0.3009$, $BP = -6.780$, $CP = -1.595$, $DP = 5.333$

[Anamorphic Aspherical Surface Data of Fifth Surface (S5)]

$KY = -0.1621$, $KX = 2.433$, $RX = -144.042$
$AR = -0.7844 \times 10^{-7}$, $BR = 0.6222 \times 10^{-11}$, $CR = -0.1370 \times 10^{-17}$, $DR = -0.8430 \times 10^{-19}$
$AP = 0.4076$, $BP = 0.3585$, $CP = 6.393$, $DP = 0.01144$

TABLE 12

<<Construction Data of Projecting Optical System (PL) of Example 6>>
Pupil Diameter (mm) = φ4.0
Projection Angle (°): 34(X Direction) × 24(Y Direction)

| Surface | Radius of Curvature | Axial Distance | Refractive Index | Abbe Number |
|---|---|---|---|---|
| S1(E2) | r1 = ∞ | | | |
| S2# | (XDE,YDE,ZDE,ADE) = (0.0,−1.567,10.456,−2.091) | | | |
| | r2 = 109.078 | | | |
| | | d2 = 6.933 | N1 = 1.719 | ν1 = 51.83 |
| S3# | r3 = −40.708 | | | |
| S4 | (XDE,YDE,ZDE,ADE) = (0.0,−2.401,19.694,1.385) | | | |
| | r4 = 73.420 | | | |
| | | d4 = 3.404 | N2 = 1.654 | ν2 = 32.37 |
| S5 | r5 = 26.498 | | | |
| S6# | (XDE,YDE,ZDE,ADE) = (0.0,−8.750,80.0,13.0) | | | |
| | r6 = 311.948 | | | |
| | | d6 = 13.000 | N3 = 1.487 | ν3 = 70.40 |
| S7# | r7 = 1.554 × 10⁶ | | | |
| S8(I) | (XDE,YDE,ZDE,ADE) = (0.0,3.985,7.391,1.780) | | | |
| | ··· {Decentering relative to Vertex of Seventh Surface (S7)} | | | |
| | r8 = 109.211 | | | |

[Anamorphic Aspherical Surface Data of Second Surface (S2)]

$KY = 1.882$, $KX = 2.050$, $RX = 54.596$
$AR = -0.2470 \times 10^{-6}$, $BR = -0.7414 \times 10^{-8}$, $CR = -0.2540 \times$ TABLE 12-continued <<Construction Data of Projecting Optical System (PL)
of Example 6>>
Pupil Diameter (mm) = φ4.0
Projection Angle (°): 34(X Direction) x 24(Y Direction)

| Surface | Radius of Curvature | Axial Distance | Refractive Index | Abbe Number |
|---------|---------------------|----------------|------------------|-------------|

$10^{-10}$, DR = $0.8772 \times 10^{-12}$
AP = −0.05608, BP = 1.119, CP = 2.117, DP = −1.297
[Anamorphic Aspherical Surface Data of Third Surface (S3)]

KY = 4.987, KX = −0.9957, RX = −67.301
AR = $0.4596 \times 10^{-7}$, BR = $-0.1552 \times 10^{-9}$, CR = $0.6478 \times 10^{-13}$, DR = $0.3089 \times 10^{-12}$
AP = 5.723, BP = 7.018, CP = −8.074, DP = 0.4965
[Anamorphic Aspherical Surface Data of Sixth Surface (S6)]

KY = 12.517, KX = 0.9425, RX = 103.357
AR = $0.3993 \times 10^{6}$, BR = $0.4379 \times 10^{-11}$, CR = $0.6744 \times 10^{-14}$, DR = $0.2664 \times 10^{-17}$
AP = −0.4249, BP = −3.985, CP = −1.782, DP = 0.05751
[Anamorphic Aspherical Surface Data of Seventh Surface (S7)]

KY = $1.123 \times 10^{9}$, KX = −2.334, RX = −322.8206
AR = $-0.2558 \times 10^{-7}$, BR = $-0.2959 \times 10^{-12}$, CR = $-0.4342 \times 10^{-14}$, DR = $0.8358 \times 10^{-23}$
AP = 5.621, BP = −12.283, CP = 0.9380, DP = −18.734

What is claimed is:

1. An image display apparatus comprising:
   a display unit for displaying a two-dimensional image; and
   an eyepiece optical system for projecting the two-dimensional image into an observer's pupil to enable the observer to view an enlarged virtual image of the two-dimensional image, the eyepiece optical system having two planes of symmetry perpendicular to each other, and the eyepiece optical system having an optical axis included in the two planes of symmetry and a visual axis for the observer's pupil,
   wherein the optical axis of the eyepiece optical system is decentered from the visual axis for the observer's pupil.

2. An image display apparatus as claimed in claim 1, wherein the display unit includes a reflection-type screen.

3. An image display apparatus as claimed in claim 1, wherein the display unit displays the two-dimensional image on a curved surface.

4. An image display apparatus as claimed in claim 2, further comprising:
   a projecting optical system for projecting the two-dimensional image onto the reflection-type screen,
   wherein a portion of the eyepiece optical system is a portion of the projecting optical system and functions as a shared optical system.

5. An image display apparatus as claimed in claim 4, wherein the shared optical system includes at least one optical surface formed as a rotationally-asymmetrical surface, and
   wherein the rotationally-asymmetrical surface is symmetrical with respect to a first plane of symmetry, the first plane of symmetry including an optical axis of the shared optical system and the visual axis for the observer's pupil, and with respect to a second plane of symmetry, the second plane of symmetry being perpendicular to the first plane of symmetry along the optical axis of the shared optical system.

6. An image display apparatus as claimed in claim 1, wherein the display unit includes a reflection type two-dimensional display device.

7. An image display apparatus as claimed in claim 6, further comprising:
   an illumination optical system for illuminating the reflection-type two-dimensional display device,
   wherein a portion of the eyepiece optical system is a portion of the illumination optical system and functions as a shared optical system.

8. An image display apparatus as claimed in claim 7, wherein the shared optical system includes at least one optical surface formed as a rotationally-asymmetrical surface, and wherein the rotationally-asymmetrical surface is symmetrical with respect to a first plane of symmetry, the first plane of symmetry including an optical axis of the shared optical system and the visual axis for the observer's pupil, and with respect to a second plane of symmetry, the second plane of symmetry being perpendicular to the first plane of symmetry along the optical axis of the shared optical system.

9. An image display apparatus comprising:
   a display unit for displaying a two-dimensional image, the display unit including a reflection-type screen; and
   an eyepiece optical system for projecting the two-dimensional image into an observer's pupil to enable the observer to view an enlarged virtual image of the two-dimensional image;
   wherein the eyepiece optical system includes at least one reflecting surface, an optical axis, and a visual axis for the observer's pupil,
   wherein the optical axis of the eyepiece optical system is decentered from and substantially parallel to the the visual axis for the observer's pupil.

10. An image display apparatus as claimed in claim 9, wherein the display unit displays the two-dimensional image on a curved surface.

11. An image display apparatus as claimed in claim 9, further comprising:
    a projecting optical system for projecting an image onto the reflection-type screen,
    wherein a portion of the eyepiece optical system is a portion of the projecting optical system and functions as a shared optical system.

12. An image display apparatus as claimed in claim 9, wherein the reflecting surface functions on a principle of back-surface reflection.

13. An image display apparatus as claimed in claim 11, wherein the shared optical system includes at least one optical surface formed as a rotationally-asymmetrical surface, and
    wherein the rotationally-asymmetrical surface is symmetrical with respect to a first plane of symmetry, the first plane of symmetry including an optical axis of the shared optical system and the visual axis for the observer's pupil, and with respect to a second plane of symmetry, the second plane of symmetry being perpendicular to the first plane of symmetry along the optical axis of the shared optical system.

14. An image display apparatus comprising:
    a display unit for displaying a two-dimensional image, the display unit including a reflection-type two-dimensional display device; and
    an eyepiece optical system for projecting the two-dimensional image into an observer's pupil to enable the observer to view an enlarged virtual image of the two-dimensional image, wherein the eyepiece optical system includes at least one reflecting surface, an optical axis, and a visual axis for the observer's pupil, wherein the optical axis of the eyepiece optical system is decentered from and substantially parallel to the visual axis for the observer's pupil.

15. An image display apparatus as claimed in claim 14, further comprising:

an illumination optical system for illuminating the reflection-type two-dimensional display device, wherein a portion of the eyepiece optical system is a portion of the illumination optical system and functions as a shared optical system.

16. An image display apparatus as claimed in claim 15, wherein the shared optical system includes at least one optical surface formed as a rotationally-asymmetrical surface, and wherein the rotationally-asymmetrical surface is symmetrical with respect to a first plane of symmetry, the first plane of symmetry including an optical axis of the shared optical system and the visual axis for the observer's pupil, and with respect to a second plane of symmetry, the second plane of symmetry being perpendicular to the first plane of symmetry along the optical axis of the shared optical system.

17. An image display apparatus comprising:

a display unit for displaying a two-dimensional image;

an eyepiece optical system for projecting the two-dimensional image into an observer's pupil to enable the observer to view an enlarged virtual image of the two-dimensional image, and a projecting optical system for creating an image on the display unit, wherein a portion of the eyepiece optical system is a portion of the projecting optical system and functions as a shared optical system, wherein the eyepiece optical system has an optical axis and a visual axis for the observer's pupil, wherein the optical axis of the eyepiece optical system is decentered from the visual axis for the observer's pupil, and wherein the shared optical system includes at least one optical surface formed as a rotationally-asymmetrical surface, and wherein the rotationally-asymmetrical surface is symmetrical with respect to a first plane of symmetry, the first plane of symmetry including an optical axis of the shared optical system and the visual axis for the observer's pupil, and with respect to a second plane of symmetry, the second plane of symmetry being perpendicular to the first plane of symmetry along the optical axis of the shared optical system.

18. An image display apparatus as claimed in claim 17, wherein the display unit includes a reflection-type screen, the projecting optical system being for projecting the image onto the reflection-type screen.

19. An image display apparatus as claimed in claim 17, wherein the display unit includes a reflection-type two-dimensional display device, the projecting optical system being for illuminating the reflection-type two-dimensional display device.

20. An image display apparatus as claimed in claim 17, wherein the display unit displays the two-dimensional image on a curved surface.

* * * * *